(12) United States Patent
Marcoe

(10) Patent No.: US 8,844,873 B2
(45) Date of Patent: Sep. 30, 2014

(54) STABILIZER TORQUE BOX ASSEMBLY AND METHOD

(75) Inventor: Jeffery Lee Marcoe, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 273 days.

(21) Appl. No.: 13/244,258

(22) Filed: Sep. 23, 2011

(65) Prior Publication Data

US 2013/0075529 A1  Mar. 28, 2013

(51) Int. Cl.
| | | |
|---|---|---|
| B64C 1/06 | (2006.01) |
| B32B 1/08 | (2006.01) |
| B64C 3/00 | (2006.01) |
| B32B 5/02 | (2006.01) |
| B32B 27/12 | (2006.01) |
| B64C 3/18 | (2006.01) |
| B32B 15/08 | (2006.01) |

(52) U.S. Cl.
CPC ............. *B32B 5/02* (2013.01); *B23B 2307/558* (2013.01); *B32B 1/08* (2013.01); *B32B 2605/00* (2013.01); *B64C 3/00* (2013.01); *B32B 27/12* (2013.01); *B64C 3/18* (2013.01); *B32B 15/08* (2013.01)
USPC ........ 244/131; 244/119; 244/123.1; 244/133; 156/149

(58) Field of Classification Search
USPC ........ 244/123.7, 123.13, 123.5, 123.6, 123.1, 244/119, 133, 1 A, 158.1, 131; 52/793.1, 52/653.2, 655.1; 296/181.2, 900, 901.01; 156/149
See application file for complete search history.

(56) References Cited

U.S. PATENT DOCUMENTS

| | | | |
|---|---|---|---|
| 1,773,357 A | 8/1930 | Griswold | |
| 3,098,664 A | 7/1963 | Waugh | |
| 4,565,595 A | 1/1986 | Whitener | |
| 4,667,905 A | 5/1987 | Hamm et al. | |
| 5,077,106 A | 12/1991 | Dursch et al. | |
| 5,332,178 A | 7/1994 | Williams | |
| 5,556,677 A * | 9/1996 | Quigley et al. | 428/36.2 |
| 5,613,794 A * | 3/1997 | Isaac et al. | 403/265 |
| 5,913,337 A * | 6/1999 | Williams et al. | 138/125 |
| 6,467,118 B2 | 10/2002 | Dumlao et al. | |
| 2003/0196741 A1* | 10/2003 | Burgess et al. | 156/92 |
| 2006/0207203 A1 | 9/2006 | Kennedy | |
| 2008/0223986 A1* | 9/2008 | Kaye | 244/119 |

FOREIGN PATENT DOCUMENTS

WO     98/37303 A1    8/1998

OTHER PUBLICATIONS

International Search Report and Written Opinion of the International Searching Authority, mailed Feb. 4, 2013, 14 pages, for Counterpart International Application PCT/US2012/047372, filed Jul. 19, 2012, The Boeing Company.

(Continued)

*Primary Examiner* — Isam Alsomiri
*Assistant Examiner* — Vincente Rodriguez

(57) ABSTRACT

In an embodiment of the disclosure, there is provided an apparatus to provide a panel stiffening element. The apparatus has an outer braided thermoplastic tube and an inner braided thermoplastic tube disposed within the outer braided thermoplastic tube. The apparatus further has a separation ply layer co-consolidated between the outer braided thermoplastic tube and the inner braided thermoplastic tube. The separation ply layer provides reinforcement and impact damage resistance to the inner braided thermoplastic tube in order to avoid a loss in structural loading capability.

18 Claims, 21 Drawing Sheets

(56) References Cited

OTHER PUBLICATIONS

Michael Favaloro, "Processing Methodologies for a Novel Braided Preform Made With Carbon/PPS Thermoplastic Tape", Ticona Engineering Polymers, 2010 Society for the Advancement of Material and Process Engineering (SAMPE) Fall Technical Conference, Salt Lake City, UT—Oct. 11-14, 2010, 5 pages.

* cited by examiner

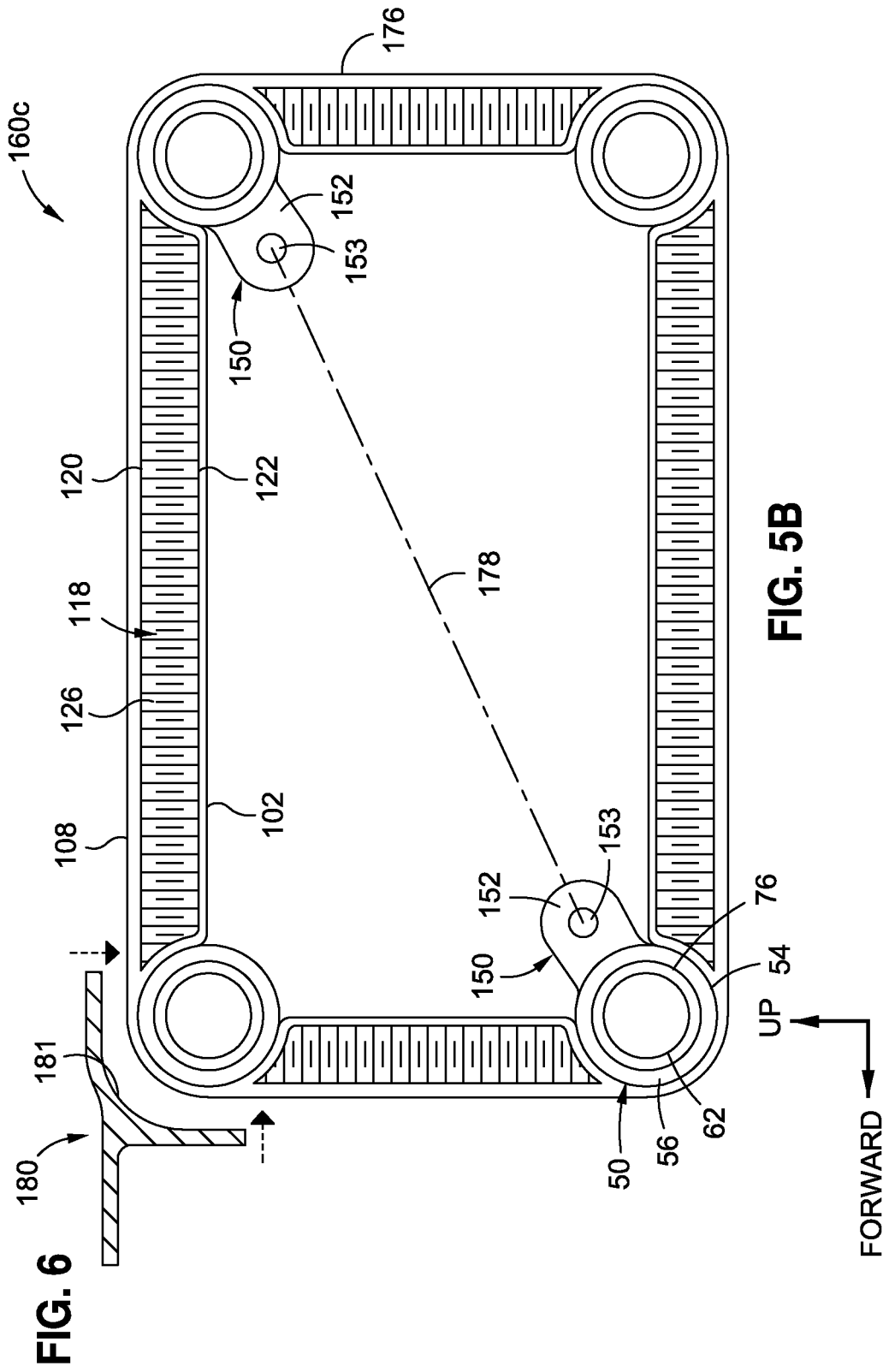

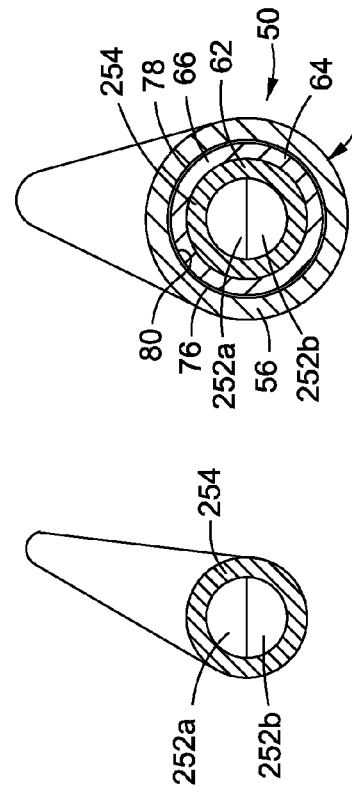
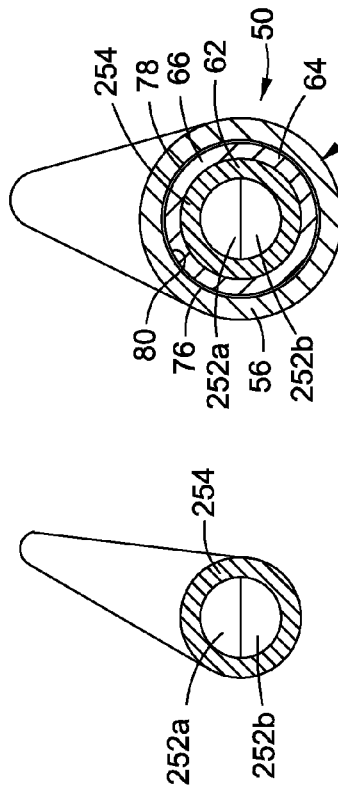
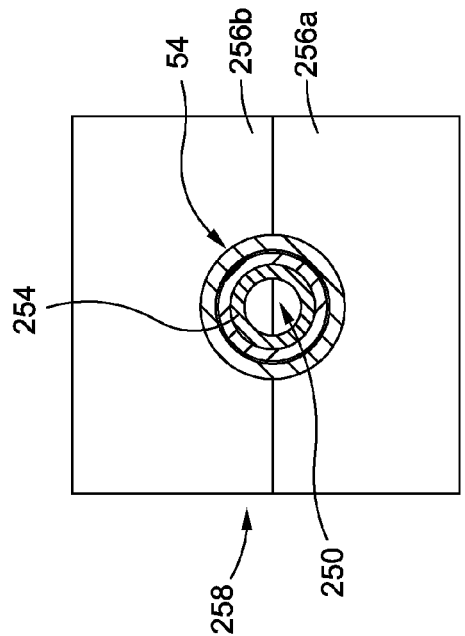
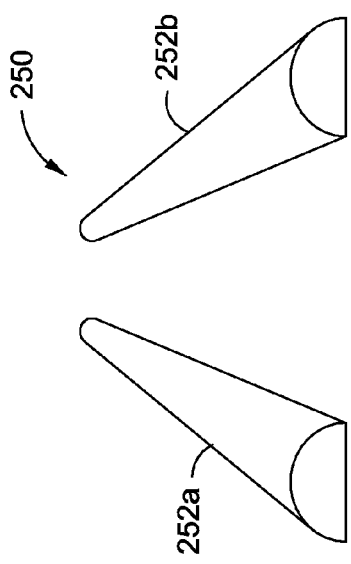
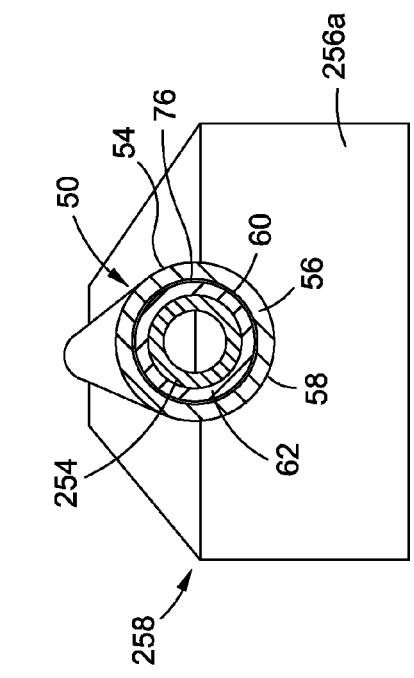

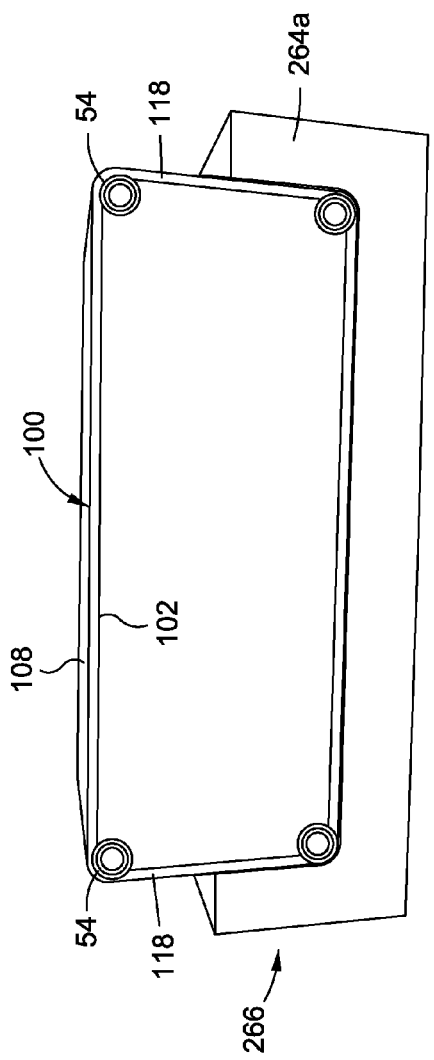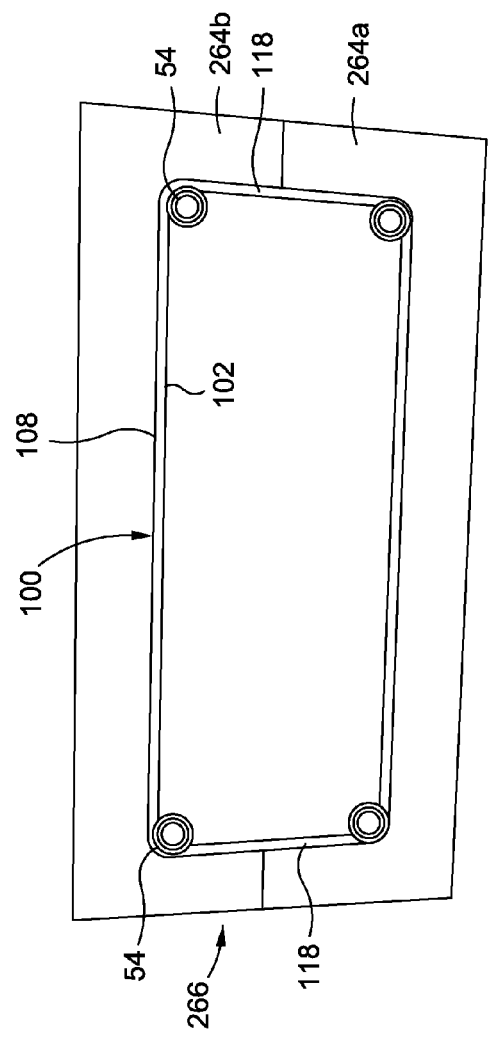
FIG. 11I
FIG. 11J

STABILIZER TORQUE BOX ASSEMBLY AND METHOD

BACKGROUND

1) Field of the Disclosure

The disclosure relates generally to stabilizer torque box assemblies and methods, and more particularly, to horizontal and vertical stabilizer torque box assemblies and methods for vehicles.

2) Description of Related Art

Thermoplastic composite structures or parts are used in a wide variety of applications, including in the manufacture of aircraft, spacecraft, rotorcraft, watercraft, automobiles, trucks, and other composite structures. In aircraft construction, thermoplastic composite structures or parts are used in increasing quantities to form the fuselage, wings, tail section, skin panels, and other components. In particular, parts of the aircraft horizontal stabilizers, also known as the horizontal tail, and parts of the aircraft vertical stabilizers, also known as a vertical tail, may be constructed of thermoplastic composite materials.

Known designs exist for aircraft thermoplastic composite and metal horizontal and vertical stabilizers that utilize either skin reinforced with stringers and stabilized by multiple ribs or multi-spar designs. For example, known horizontal or vertical stabilizers for large aircraft may be constructed of three spars and multiple ribs and stringers. The primary bending loads may be carried by stressed skins, and stringers inside thereof, in torque boxes, spaced forward and aft between a front spar and a rear spar. The ribs, extending forward and aft, stabilize the skin and stringers (e.g., shorten the stringer lengths) and provide load paths for concentrated transverse loads such as horizontal stabilizer pivot and elevator hinges. However, such known horizontal and vertical stabilizer designs may have an increased weight due to the multiple stringers and ribs used to stabilize the skin (e.g., prevent skin buckling due to compression loads).

In addition, known designs exist for aircraft composite and metal horizontal and vertical stabilizers that utilize honeycomb sandwich structures to eliminate the use of stringers and some of the ribs. However, where the stringers are eliminated, the structural arrangement may require the addition of intermediate spars which may eliminate any weight savings provided by the honeycomb sandwich structure used between the ribs and spars.

In addition, known methods and systems for fabricating and installing aircraft horizontal or vertical stabilizers include manual methods and systems and typically require multiple sets of tooling and molding operations. Such known methods and systems may apply pressure via each internal mandrel forcing all of the parts together. This may limit or prevent fabrication and processing techniques that use braiding machines to braid thermoplastic composite materials because once parts are assembled together, it may be difficult, if not impossible, to put the assembled parts through the braiding machine. Moreover, such known methods and systems for fabricating aircraft horizontal or vertical stabilizers may require increased time and increased labor which, in turn, may increase fabrication costs.

Accordingly, there is a need in the art for improved horizontal and vertical stabilizer torque box assemblies for vehicles and improved methods for fabricating such horizontal and vertical stabilizer torque box assemblies for vehicles that provide advantages over known assemblies, devices, systems and methods.

SUMMARY

This need for improved horizontal and vertical stabilizer torque box assemblies for vehicles and improved methods for fabricating such horizontal and vertical stabilizer torque box assemblies for vehicles is satisfied. As discussed in the below detailed description, embodiments of the improved horizontal and vertical stabilizer torque box assemblies for vehicles and improved methods for fabricating such horizontal and vertical stabilizer torque box assemblies for vehicles may provide significant advantages over existing assemblies, devices, systems and methods.

In an embodiment of the disclosure, there is provided an apparatus to provide panel stiffening. The apparatus comprises an outer braided thermoplastic tube. The apparatus further comprises an inner braided thermoplastic tube disposed within the outer braided thermoplastic tube. The apparatus further comprises a separation ply layer co-consolidated between the outer braided thermoplastic tube and the inner braided thermoplastic tube. The separation ply layer provides reinforcement and impact damage resistance to the inner braided thermoplastic tube in order to avoid a loss in structural loading capability.

In another embodiment of the disclosure, there is provided a thermoplastic stabilizer torque box assembly. The assembly comprises a plurality of braided thermoplastic tubular spar caps spaced to define a torque box inner portion. Each braided thermoplastic tubular spar cap comprises an outer braided thermoplastic tube, an inner braided thermoplastic tube disposed within the outer braided thermoplastic tube, and a separation ply layer co-consolidated between the outer braided thermoplastic tube and the inner braided thermoplastic tube. The separation ply layer provides reinforcement and impact damage resistance to the inner braided thermoplastic tube in order to avoid a loss in structural loading capability. The assembly further comprises a thermoplastic skin panel co-consolidated to the plurality of braided thermoplastic tubular spar caps to define a torque box outer portion. The thermoplastic skin panel comprises an inner thermoplastic facesheet, an outer thermoplastic facesheet and a plurality of core elements. The assembly further comprises one or more braided thermoplastic tubular truss ribs connected to the one or more braided thermoplastic tubular spar caps via one or more connection assemblies.

In another embodiment of the disclosure, there is provided a method of fabricating a thermoplastic stabilizer torque box assembly. The method comprises providing a plurality of braided thermoplastic tubular spar caps. The method further comprises connecting one or more connector elements to one or more of the braided thermoplastic tubular spar caps. The method further comprises placing at least one braided thermoplastic tubular spar cap in each corner of an internal torque box tooling apparatus to define a torque box inner portion. The method further comprises laying up an inner thermoplastic facesheet in a continuous manner around the braided thermoplastic tubular spar caps to define a torque box structure around the braided thermoplastic tubular spar caps and to define at least a torque box inner surface. The method further comprises attaching a plurality of skin panel stabilization elements to the inner thermoplastic facesheet to define four torque box side portions. The method further comprises laying up and attaching an outer thermoplastic facesheet in a continuous manner around the plurality of skin panel stabilization elements to define a torque box circumference. The method further comprises placing the braided thermoplastic tubular spar caps, the inner and outer thermoplastic facesheets, and the skin panel stabilization elements in a torque box match mold tooling apparatus. The method further comprises heating at an effective temperature and an effective pressure the braided thermoplastic tubular spar caps, the inner and outer thermoplastic facesheets, and the skin panel stabilization elements in the torque box match mold tooling apparatus to form a thermoplastic stabilizer torque box assembly. The method may further comprise cooling the thermoplastic stabilizer torque box assembly. The method further comprises removing the thermoplastic stabilizer torque box assembly from the torque box match mold tooling apparatus. The method may further comprise attaching one or more braided thermoplastic tubular truss ribs to one or more of the braided thermoplastic tubular spar caps via the one or more connector elements. The method may further comprise attaching leading and trailing edge interface elements to the thermoplastic stabilizer torque box assembly.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 5B is an illustration of a cross-sectional view taken along lines 5B-5B of FIG. 5A;

FIG. 6 is an illustration of a sectional view of one of the embodiments of a leading and trailing edge interface element that may be attached in each corner of the thermoplastic stabilizer torque box assembly of FIG. 5A;

FIG. 11A is an illustration of a split tooling mandrel used in one of the embodiments of a method of fabricating a thermoplastic stabilizer torque box assembly of the disclosure;

FIG. 11B is an illustration of the split tooling mandrel of FIG. 11A and a removable sleeve used in one of the embodiments of a method of fabricating a thermoplastic stabilizer torque box assembly of the disclosure;

FIG. 11C is an illustration of the split tooling mandrel and removable sleeve of FIG. 11B and a braided thermoplastic tubular spar cap to be co-consolidated in one of the embodiments of a method of fabricating a thermoplastic stabilizer torque box assembly of the disclosure;

FIG. 11D is an illustration of the braided thermoplastic tubular spar cap of FIG. 11C placed in a first half of a tubular match mold tooling apparatus used in one of the embodiments of a method of fabricating a thermoplastic stabilizer torque box assembly of the disclosure;

FIG. 11E is an illustration of the braided thermoplastic tubular spar cap of FIG. 11C secured in a tubular match mold tooling apparatus for co-consolidation used in one of the embodiments of a method of fabricating a thermoplastic stabilizer torque box assembly of the disclosure;

FIG. 11I is an illustration of the fabricated, co-consolidated braided thermoplastic tubular spar caps, inner and outer thermoplastic facesheets, and skin panel stabilization elements of FIG. 11H placed in a first half of a torque box match mold tooling apparatus used in one of the embodiments of a method of fabricating an aircraft horizontal or vertical stabilizer of the disclosure;

FIG. 11J is an illustration of the fabricated, co-consolidated braided thermoplastic tubular spar caps, inner and outer thermoplastic facesheets, and skin panel stabilization elements of FIG. 11H secured in a torque box match mold tooling apparatus for consolidation used in one of the embodiments of a method of fabricating a thermoplastic stabilizer torque box assembly of the disclosure;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
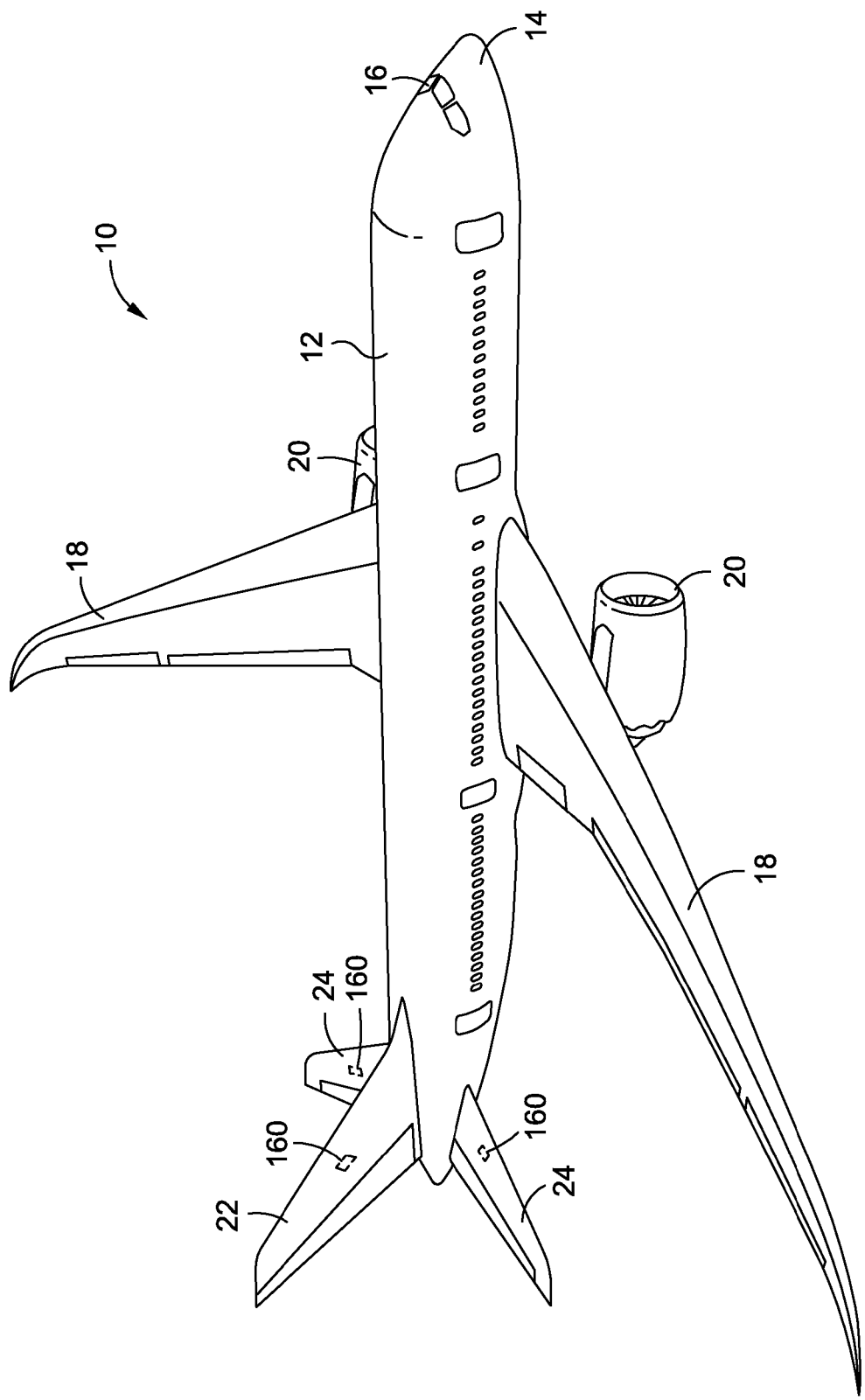
FIG. 1 is an illustration of a perspective view of an aircraft which may incorporate one or more advantageous embodiments of an apparatus and an assembly of the disclosure.

Now referring to the Figures, FIG. 1 is an illustration of a perspective view of an aircraft 10 which may incorporate one or more advantageous embodiments of a thermoplastic stabilizer torque box assembly 160 and an apparatus 50 to provide a panel stiffening element 52, as disclosed herein. As shown in FIG. 1, the aircraft 10 comprises a fuselage 12, a nose 14, a cockpit 16, wings 18 operatively coupled to the fuselage 12, one or more propulsion units 20, a tail vertical stabilizer 22, and one or more tail horizontal stabilizers 24. The aircraft 10 may be made from composite and/or metallic materials that may be used on such portions of the aircraft 10, including but not limited to, the fuselage 12, the nose 14, the wings 18, the tail vertical stabilizer 22, and the one or more tail horizontal stabilizers 24. Although the aircraft 10 shown in FIG. 1 is generally representative of a commercial passenger aircraft, the apparatus 50 and the thermoplastic stabilizer torque box assembly 160, as disclosed herein, may also be employed in other types of aircraft. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of devices, methods, and systems in accordance with the disclosure may be utilized in other transport vehicles, such as boats and other watercraft, trains, automobiles, trucks, buses, or other suitable transport vehicles.

Figure 2:
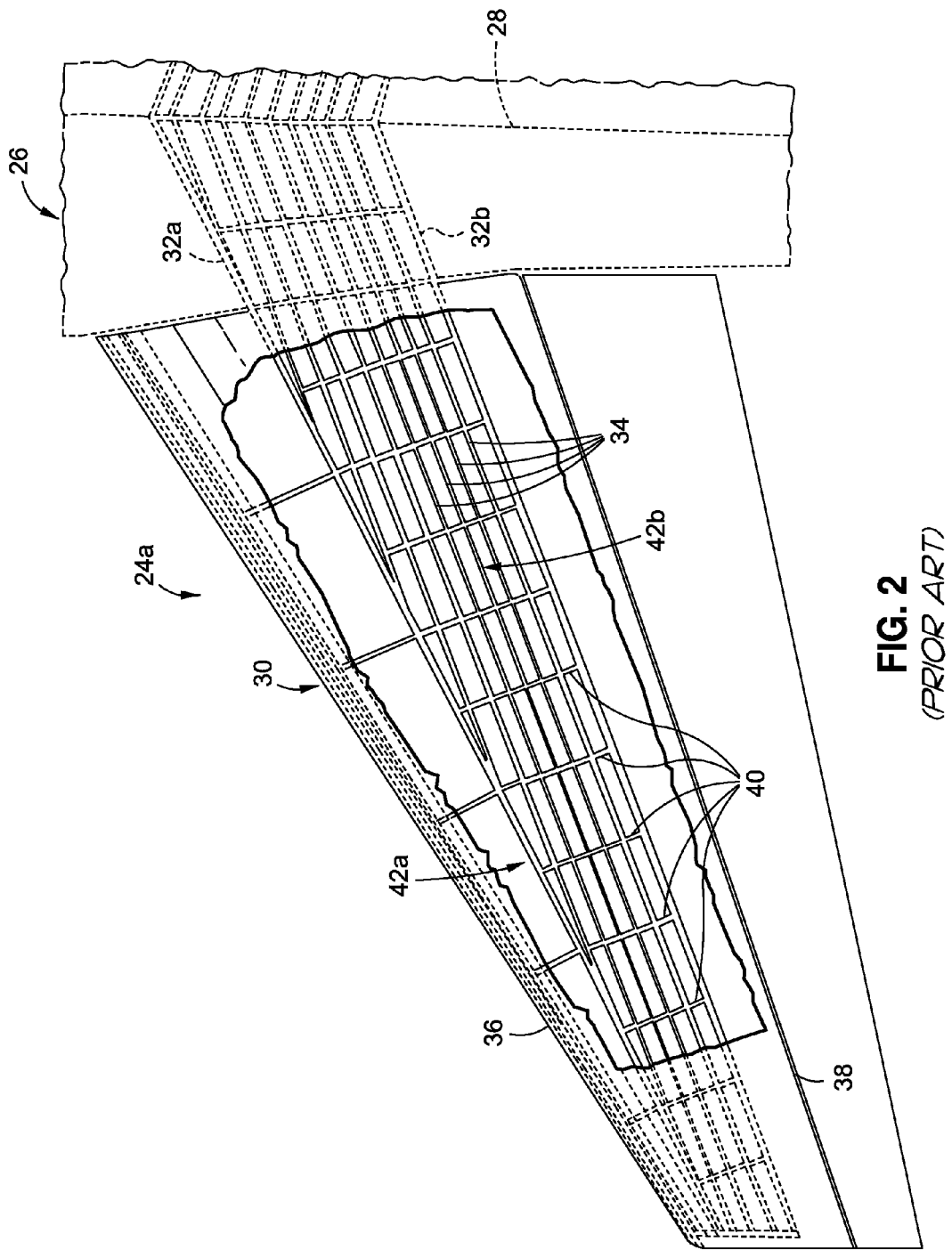
FIG. 2 is an illustration of a partially cut away plan view of a known horizontal stabilizer of an aircraft tail section.

FIG. 2 is an illustration of a partially cut away plan view of a known horizontal stabilizer 24a of an aircraft tail section 26 having an aircraft centerline 28. A semispan 30 of the horizontal stabilizer 24a extends outboardly from the aircraft tail section 26 and is secured thereto by front spars 32a and rear spars 32b. Between the front spars 32a and the rear spars 32b are a plurality of outboardly extending stringers 34. FIG. 2 also shows a leading edge 36 and a trailing edge 38, ribs 40, and a forward torque box 42a and an aft torque box 42b.

Figure 3:
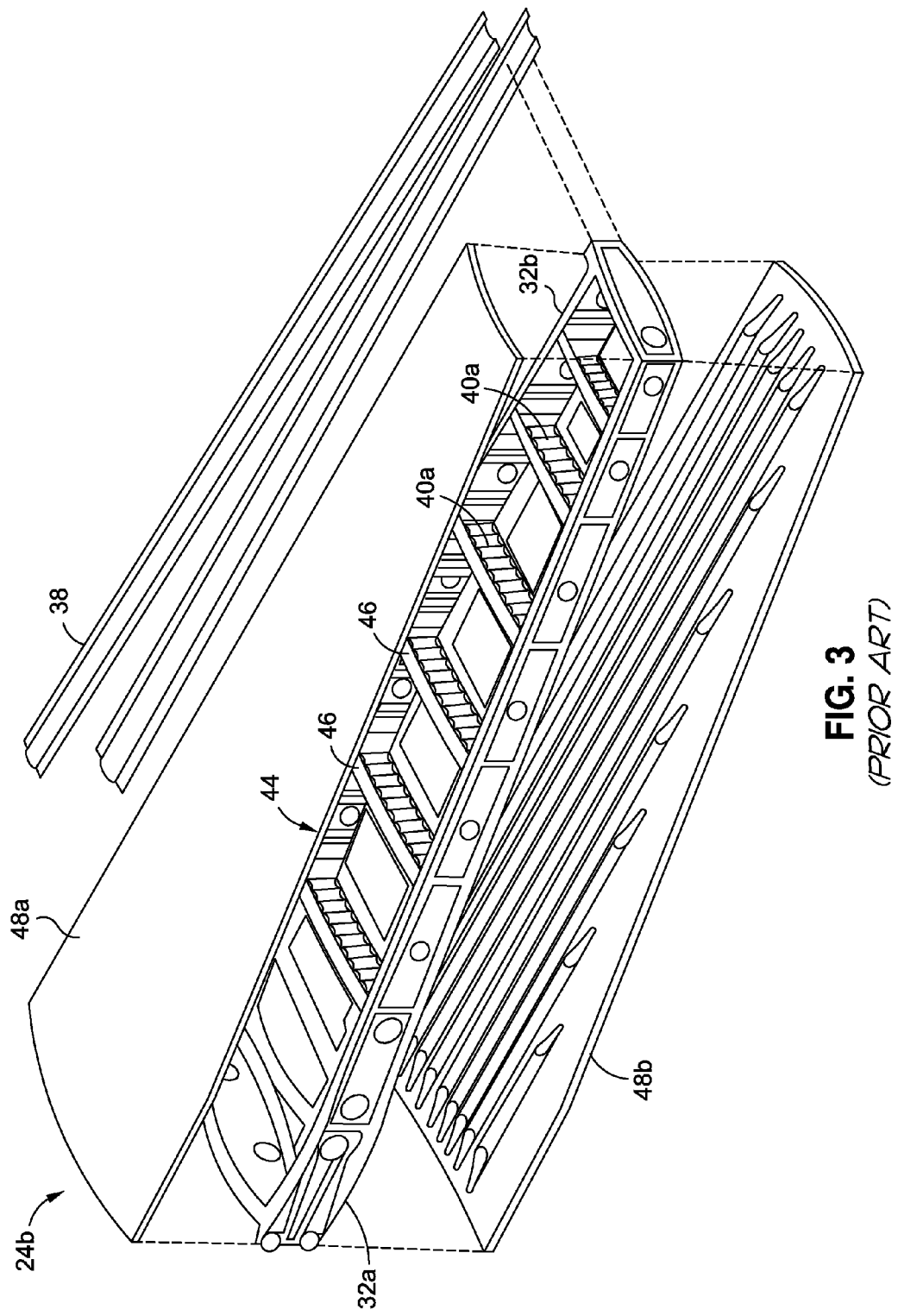
FIG. 3 is an illustration of an exploded perspective view of a known aircraft tail section horizontal stabilizer showing a stiffened skin structural box assembly with I-section stiffener panels.

FIG. 3 is an illustration of an exploded perspective view of another known horizontal stabilizer 24b having a stiffened skin torque box assembly 44 with I-section panel stiffeners 46. FIG. 3 also shows an upper skin panel 48a, a lower skin panel 48b, front spars 32a, rear spars 32b, trailing edge 38, and honeycomb ribs 40a of the known horizontal stabilizer 24b.

Figure 4A:
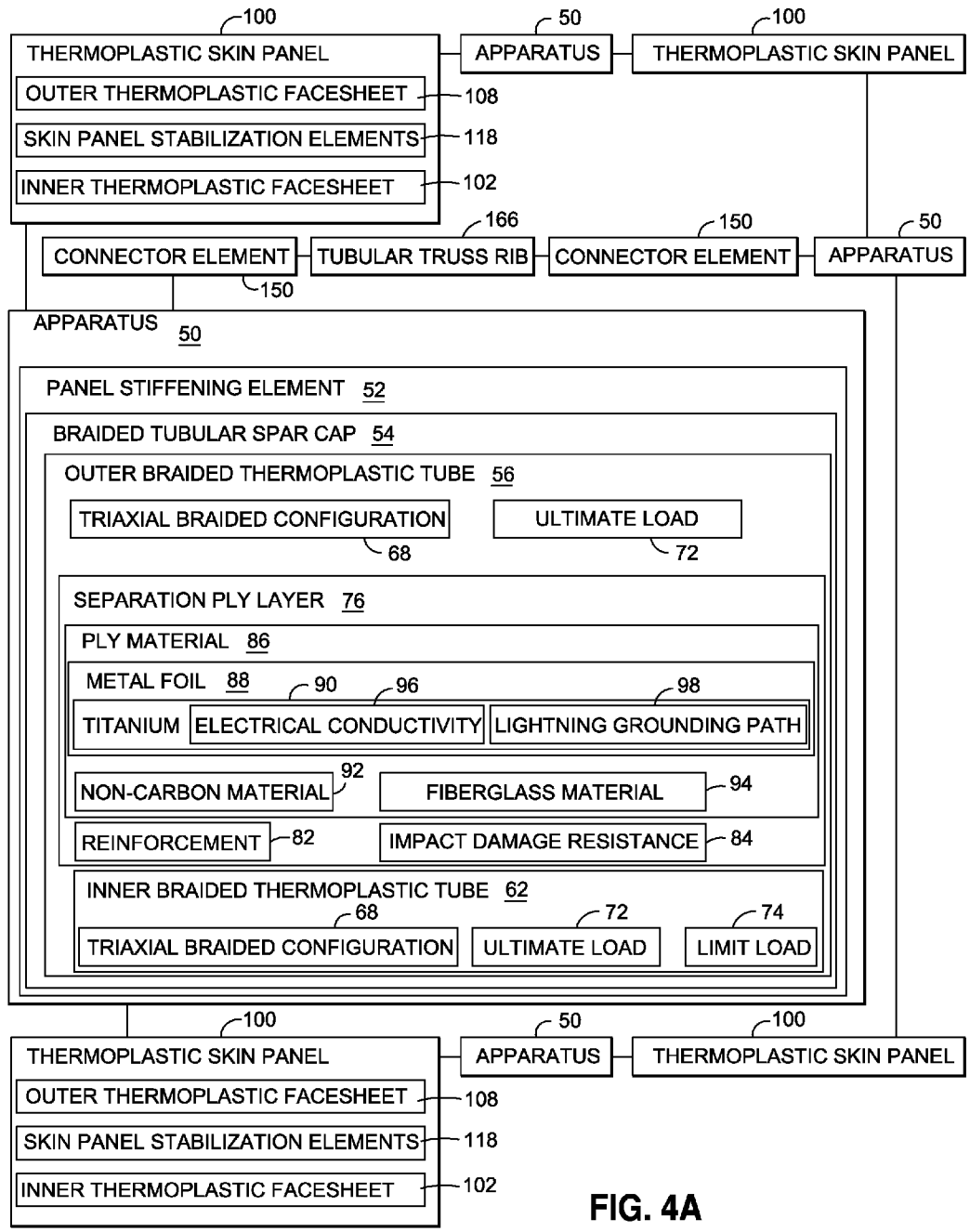
FIG. 4A is an illustration of a functional block diagram showing one of the embodiments of an apparatus to provide a panel stiffening element of the disclosure.
Figure 8A:
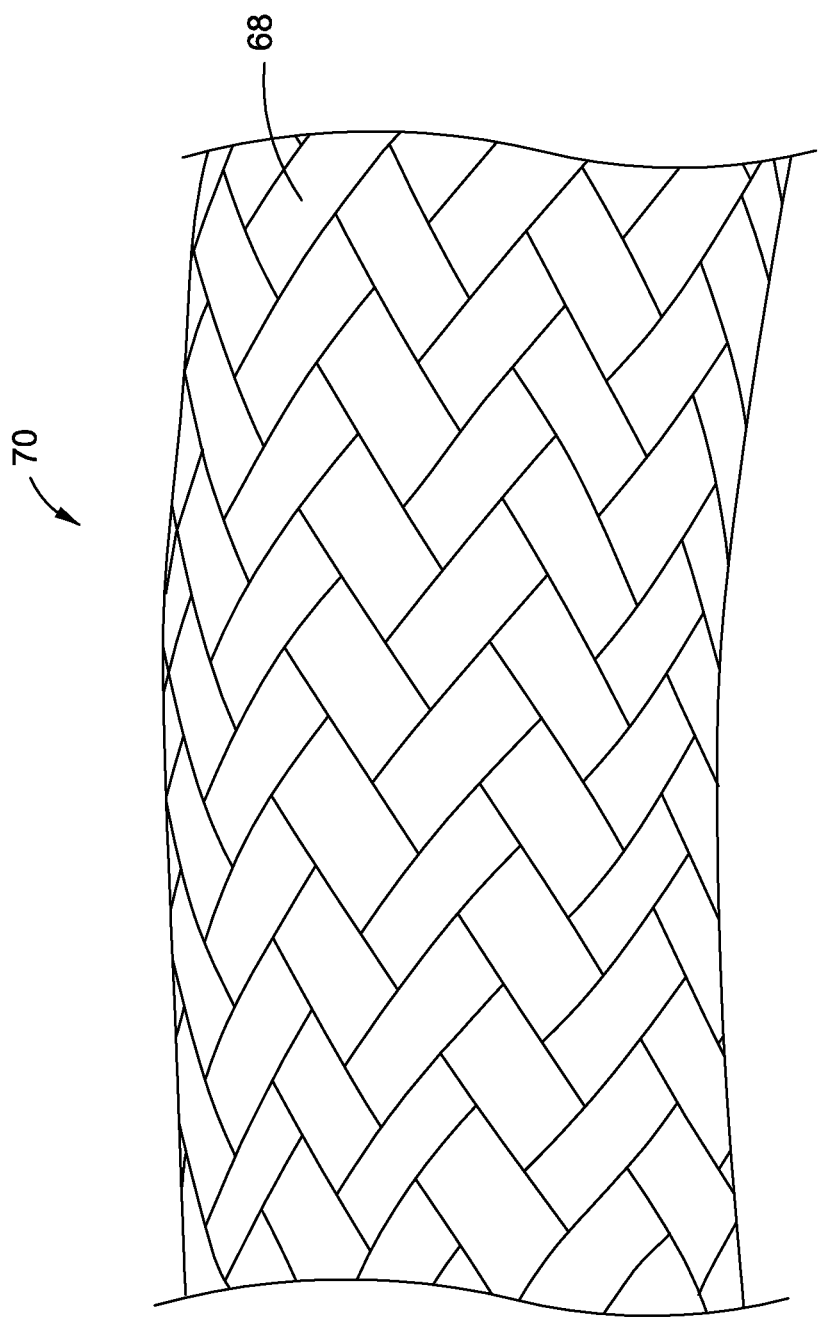
FIG. 8A is an illustration of a known braided preform having a biaxial braided configuration.
Figure 8B:
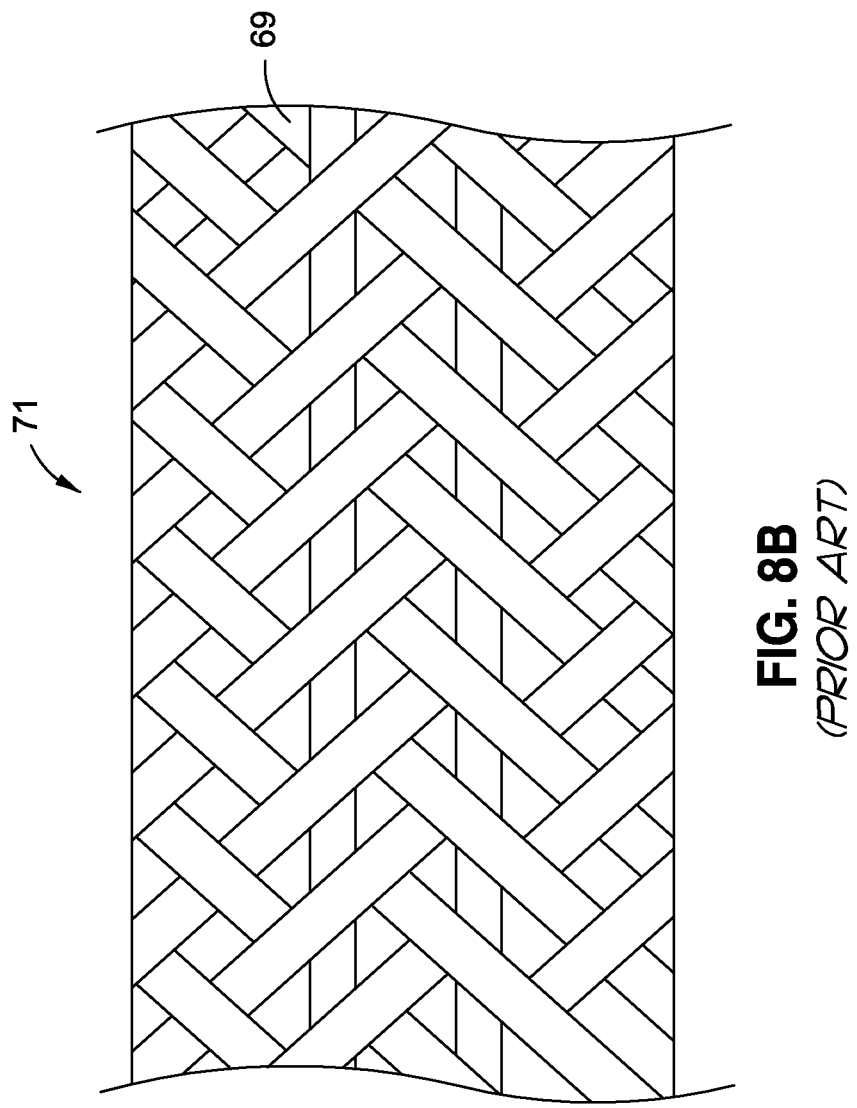
FIG. 8B is an illustration of a known braided preform having a triaxial braided configuration.

FIG. 4A is an illustration of a functional block diagram showing one of the embodiments of an apparatus 50 to provide panel stiffening, such as a panel stiffening element 52, as disclosed herein. The apparatus 50 is also shown in cross-section in FIG. 5B, is shown in perspective view in FIG. 9, and is shown in close-up cross-sectional view in FIG. 11O. Preferably, the apparatus 50 is a braided thermoplastic tubular spar cap 54 (see FIG. 4A). The apparatus 50 comprises an outer braided thermoplastic tube 56 having an outer surface 58 (see FIG. 11O) and an inner surface 60 (see FIG. 11O). The apparatus 50 further comprises an inner braided thermoplastic tube 62 (see FIG. 4A) disposed within the outer braided thermoplastic tube 56 and having an outer surface 64 (see FIG. 11O) and an inner surface 66 (see FIG. 11O). Preferably, the outer braided thermoplastic tube 56 and the inner braided thermoplastic tube 62 both have a triaxial braided configuration 69 (see FIG. 8B). FIG. 8B is an illustration of a known braided preform 71 having the triaxial braided configuration 69. Fabrication and tooling for the outer braided thermoplastic tube 56 and the inner braided thermoplastic tube 62 are discussed in further detail below.

Preferably, the outer braided thermoplastic tube 56 and the inner braided thermoplastic tube 62 are comprised of a thermoplastic material, such as carbon fiber composite material, carbon fiber reinforced, semi crystalline, polymer material, for example, carbon fiber reinforced polyphenylene sulfide (PPS), carbon fiber reinforced polyetheretherketone (PEEK), carbon fiber reinforced polyetherketoneketone (PEKK), carbon fiber reinforced polyethyleneimine (PEI), or another suitable thermoplastic material. The utilization of braided thermoplastic material for the outer braided thermoplastic tube 56 and the inner braided thermoplastic tube 62 may provide inherent through the thickness capability over known solid tape laminates and may further provide damage resistance and damage tolerance.

The outer braided thermoplastic tube 56 (see FIG. 4A) and the inner braided thermoplastic tube 62 are preferably sized to together carry an ultimate load 72 (see FIG. 4A). In addition, the inner braided thermoplastic tube 62 is preferably sized to carry a limit load 74 (see FIG. 4A). Limit loads are defined as the maximum loads expected in service. Federal Aviation Administration (FAA) Federal Aviation Regulation (FAR) Part 25 specifies that there be no permanent deformation of the structure at limit load. Ultimate loads are defined as the limit loads times a safety factor. FAA FAR Part 25 specifies the safety factor as 1.5. For some research or military aircraft the safety factor may be as low as 1.20.

The apparatus 50 further comprises a separation ply layer 76 (see FIG. 4A and FIG. 11D) co-consolidated between the outer braided thermoplastic tube 56 and the inner braided thermoplastic tube 62. The separation ply layer 76 has an outer surface 78 (see FIG. 11O) and an inner surface 80 (see FIG. 11O) and provides reinforcement 82 (see FIG. 4A) and impact damage resistance 84 (see FIG. 4A) to the inner braided thermoplastic tube 62 in order to prevent a loss in structural loading capability, i.e., a discrete source, such as an object impacting against the thermoplastic stabilizer torque box assembly 160, may potentially damage one or more of the braided thermoplastic tubular spar caps 54, but the rest of the thermoplastic stabilizer torque box assembly 160 may still have the capability of carrying a specific load level. As shown in FIG. 4A, the separation ply layer 76 preferably comprises a ply material 86, such as a metal foil 88, for example, titanium 90, steel, aluminum or another suitable metal; a non-carbon material 92; a fiberglass material 94, or another suitable ply material. More preferably, the separation ply layer 76 is comprised of titanium 90 or another material having an electrical conductivity 96 to provide a lightning grounding path 98.

Figure 4B:
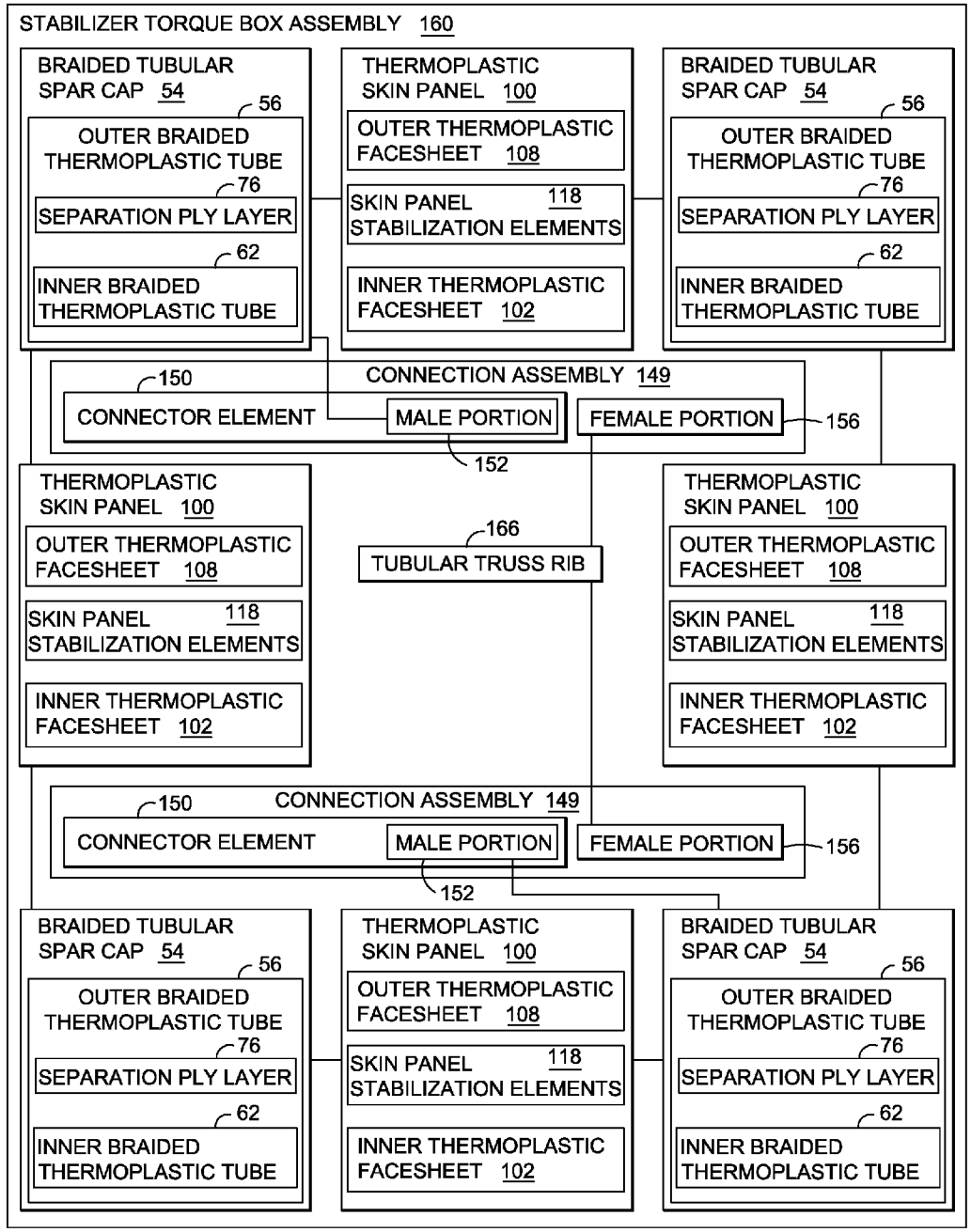
FIG. 4B is an illustration of a functional block diagram showing one of the embodiments of a thermoplastic stabilizer torque box assembly of the disclosure.
Figure 4C:
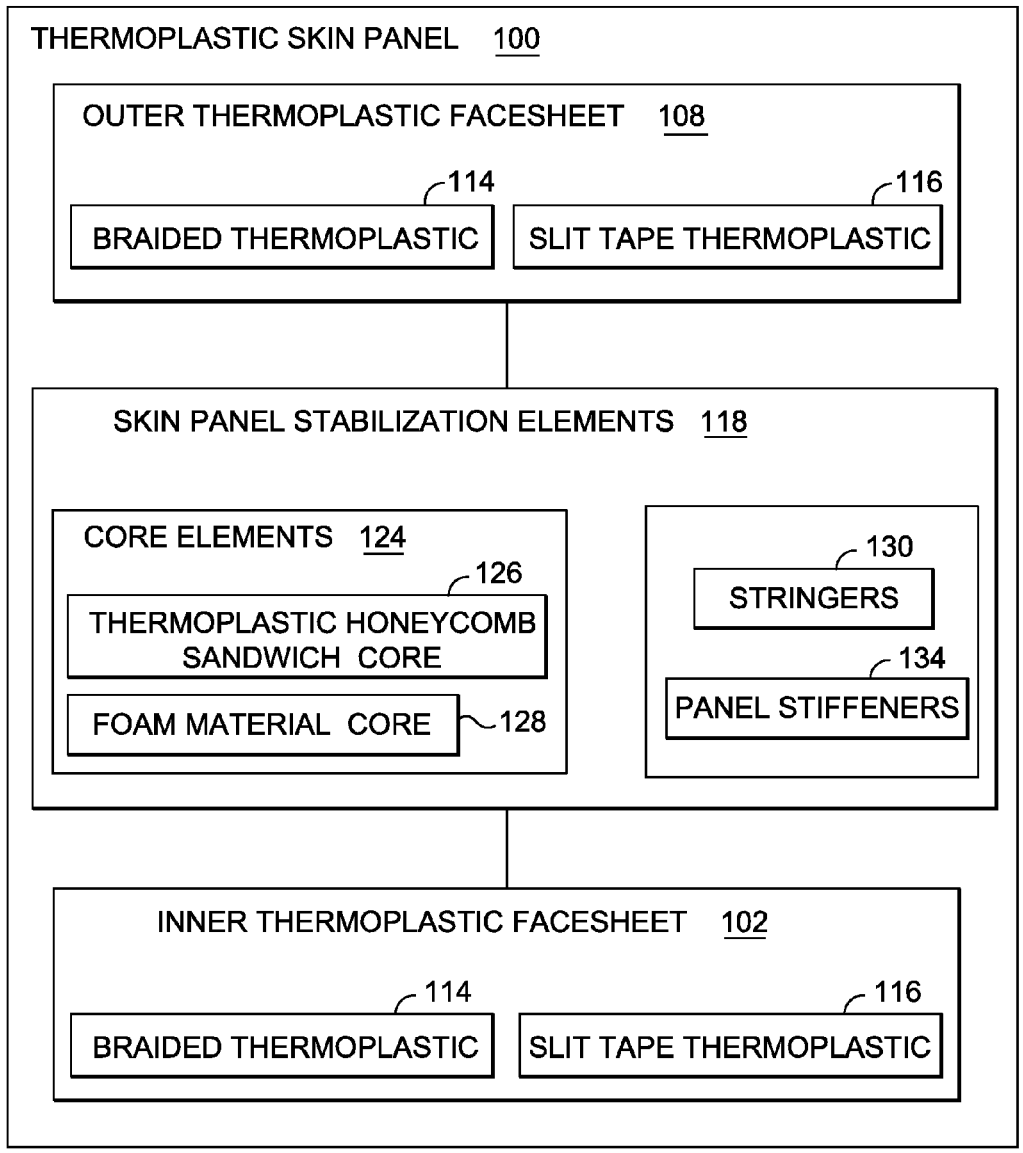
FIG. 4C is an illustration of a functional block diagram showing one of the embodiments of a thermoplastic skin panel of the disclosure.

Preferably, the apparatus 50 comprises the braided thermoplastic tubular spar cap 54 which is co-consolidated with a thermoplastic skin panel 100 (see FIGS. 4A, 4C, and 5B). FIG. 4C is an illustration of a functional block diagram showing one of the embodiments of the thermoplastic skin panel 100 of the disclosure. As shown in FIG. 4C, the thermoplastic skin panel 100 comprises an inner thermoplastic facesheet 102 having an inner surface 104 (see FIG. 11O) and an outer surface 106 (see FIG. 11O). The thermoplastic skin panel 100 further comprises an outer thermoplastic facesheet 108 (see FIG. 4C) having an inner surface 110 (see FIG. 11O) and an outer surface 112 (see FIG. 11O). In one embodiment, the inner and outer thermoplastic facesheets 102, 108, respectively, may be comprised of braided thermoplastic 114 (see FIG. 4C) having the triaxial braided configuration 69 (see FIG. 8B). The utilization of braided thermoplastic material for the inner and outer thermoplastic facesheets 102, 108 may provide inherent through the thickness capability and may further provide damage resistance and damage tolerance. Inherent through the thickness capability may refer to braiding being composed of fiber tows that cross over each other thereby improving through the thickness capability, e.g., out of plane loading compared to solid laminates. Solid laminates may be placed in a stack on top of each other without through the thickness fiber members.

In another embodiment, the inner and outer thermoplastic facesheets 102, 108, respectively, may be comprised of slit tape thermoplastic 116 (see FIG. 4C). The utilization of slit tape thermoplastic material for the inner and outer thermoplastic facesheets 102, 108 may provide decreased tape crossover and kinking. Fabrication and tooling for the inner and outer thermoplastic facesheets 102, 108 are discussed in further detail below. Preferably, the inner and outer thermoplastic facesheets 102, 108 are comprised of a thermoplastic material, such as carbon fiber composite material, carbon fiber reinforced, semi crystalline, polymer material, for example, carbon fiber reinforced polypheylene sulfide (PPS), carbon fiber reinforced polyetheretherketone (PEEK), carbon fiber reinforced polyetherketoneketone (PEKK), carbon fiber reinforced polyethyleneimine (PEI), or another suitable thermoplastic material. The thermoplastic material allows for co-consolidation or welding of the inner and outer thermoplastic facesheets 102, 108 to the braided thermoplastic tubular spar caps 54. In addition, the thermoplastic material allows for potential welding of support or systems brackets (not shown) to the inner and outer thermoplastic facesheets 102, 108.

Figure 10:
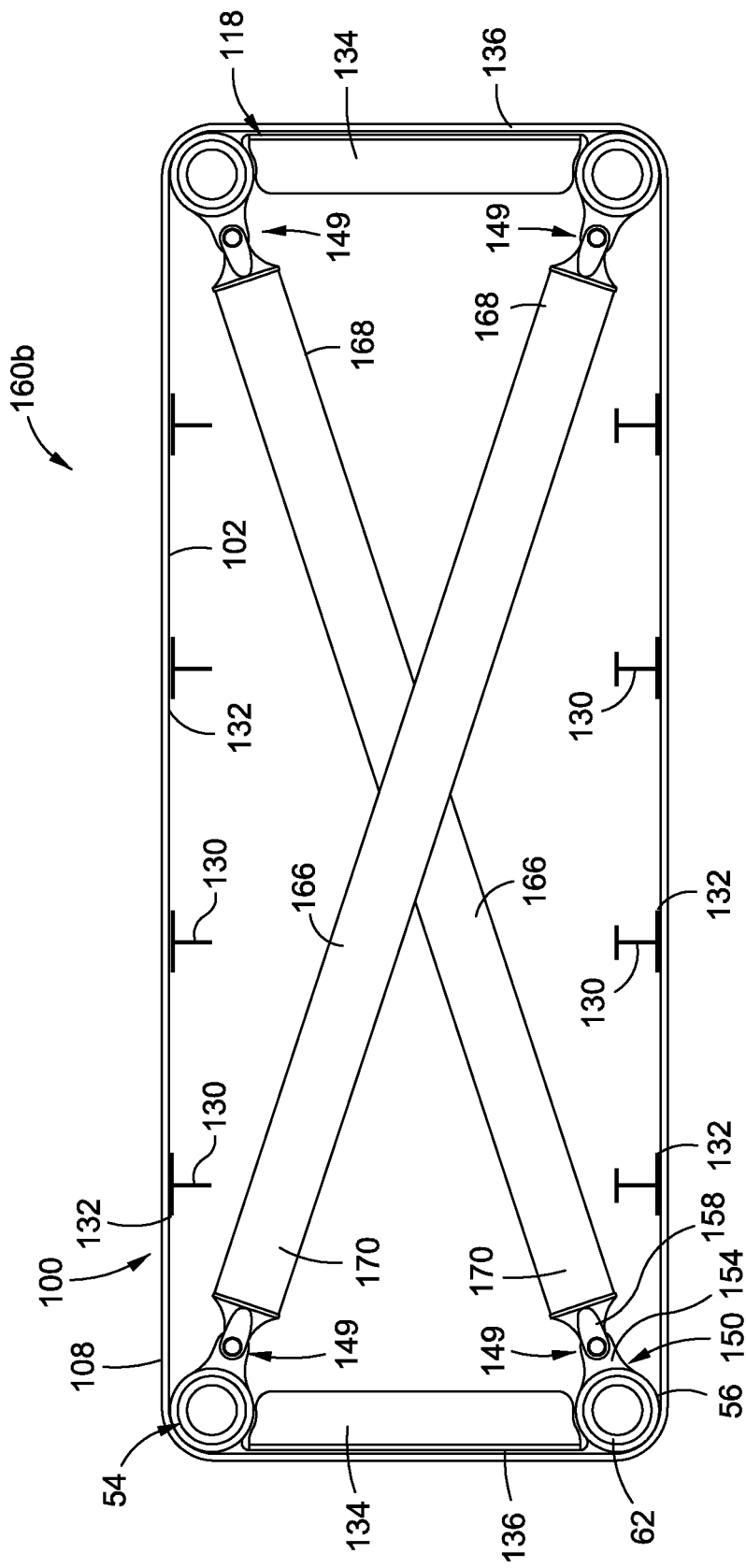
FIG. 10 is an illustration of an isometric view of another one of the embodiments of a thermoplastic stabilizer torque box assembly of the disclosure.
Figure 11F:
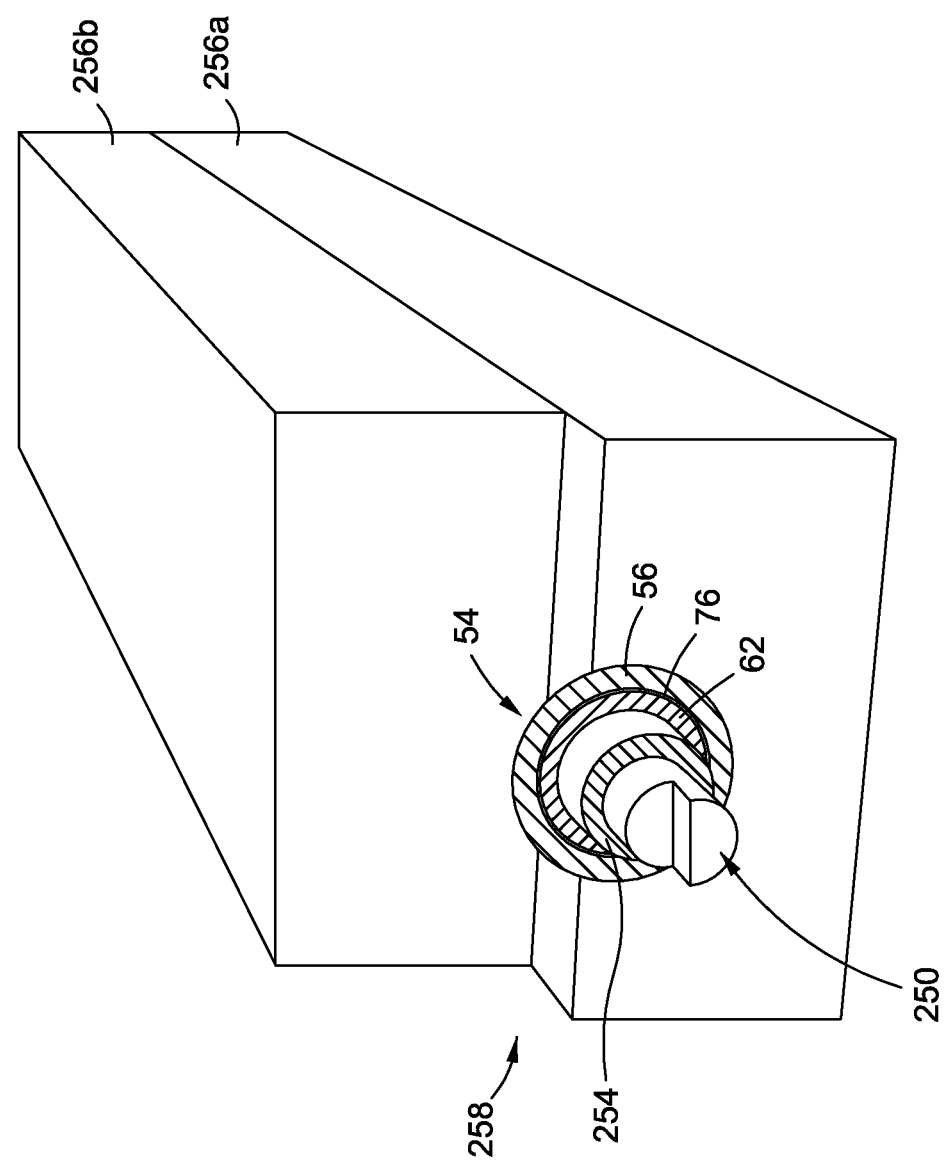
FIG. 11F is an illustration of a cut-away view of the co-consolidated braided thermoplastic tubular spar cap in the tubular match mold tooling apparatus of FIG. 11E.
Figure 11G:
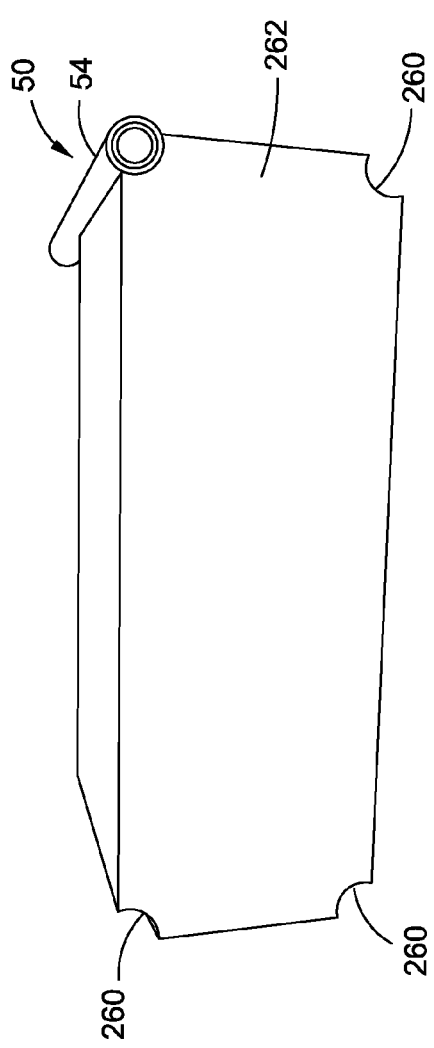
FIG. 11G is an illustration of a fabricated, co-consolidated braided thermoplastic tubular spar cap placed in a corner of an internal torque box tooling apparatus used in one of the embodiments of a method of fabricating a thermoplastic stabilizer torque box assembly of the disclosure.
Figure 11H:
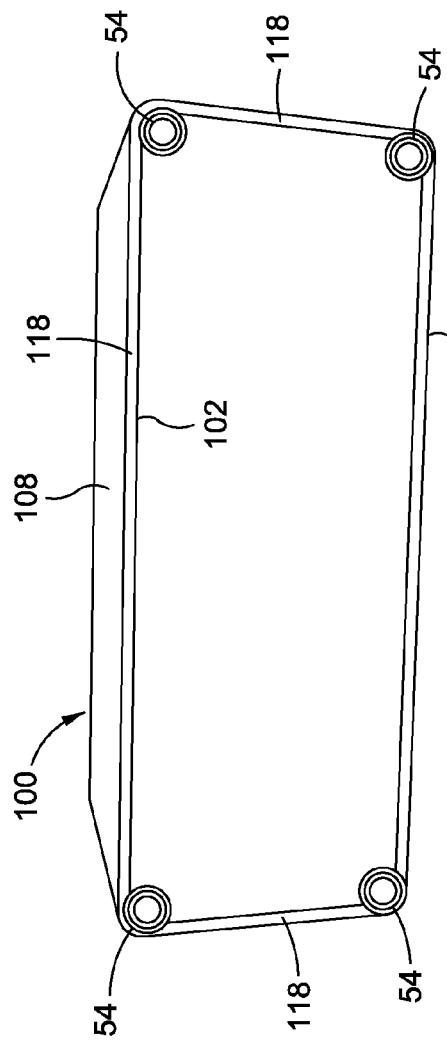
FIG. 11H is an illustration of fabricated, co-consolidated braided thermoplastic tubular spar caps, inner and outer thermoplastic facesheets, and skin panel stabilization elements added around the internal torque box tooling apparatus used in one of the embodiments of a method of fabricating a thermoplastic stabilizer torque box assembly of the disclosure.
Figure 11K:
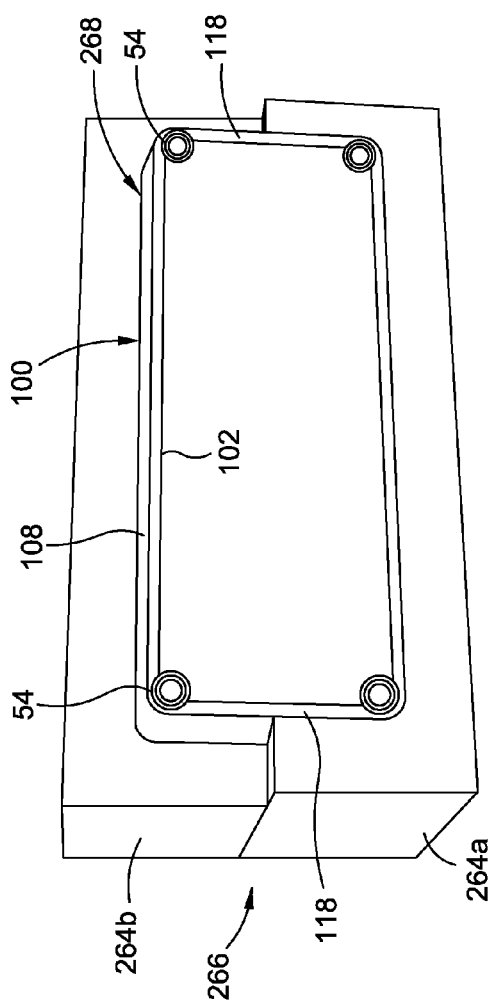
FIG. 11K is an illustration of a cut-away view of the co-consolidated thermoplastic stabilizer torque box assembly in the torque box match mold tooling apparatus of FIG. 11J.
Figure 11L:
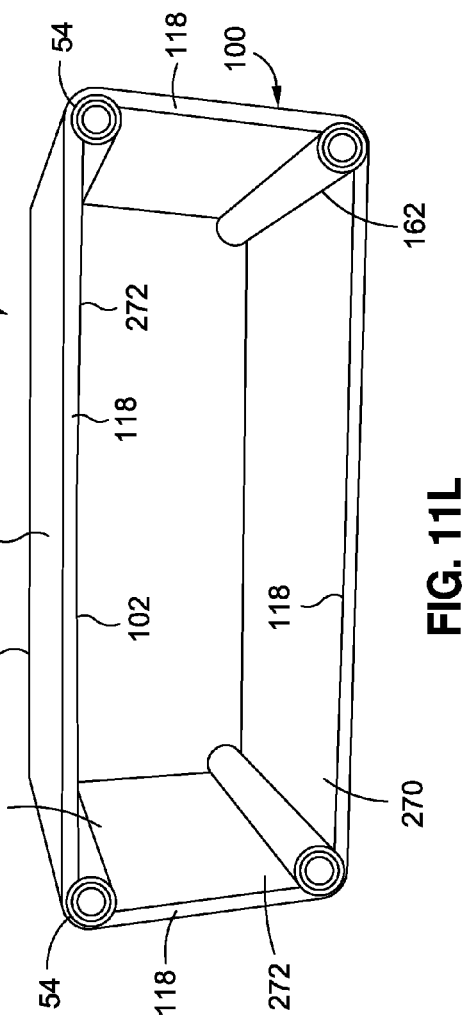
FIG. 11L is an illustration of the thermoplastic stabilizer torque box assembly with the torque box match mold tooling apparatus removed used in one of the embodiments of a method of fabricating a thermoplastic stabilizer torque box assembly of the disclosure.
Figure 11M:
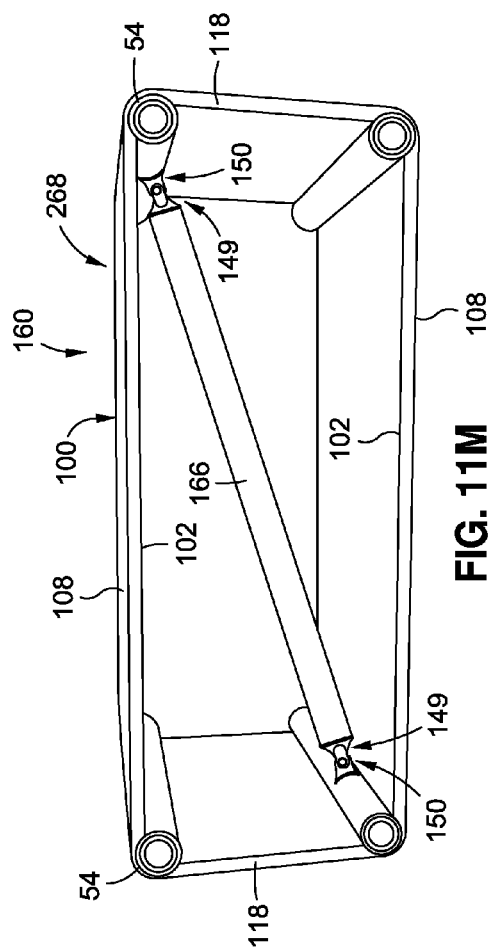
FIG. 11M is an illustration of the thermoplastic stabilizer torque box assembly of FIG. 11L with a braided thermoplastic tubular truss rib attached via connector elements to two braided thermoplastic tubular spar caps used in one of the embodiments of a method of fabricating a thermoplastic stabilizer torque box assembly of the disclosure.
Figure 11N:
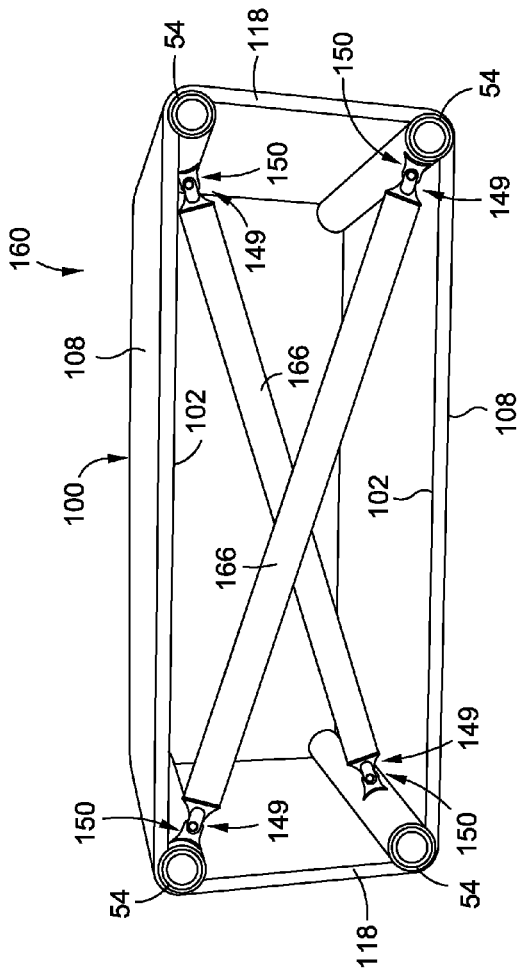
FIG. 11N is an illustration of the thermoplastic stabilizer torque box assembly of FIG. 11L with two braided thermoplastic tubular truss ribs attached via connector elements to four braided thermoplastic tubular spar caps used in one of the embodiments of a method of fabricating a thermoplastic stabilizer torque box assembly of the disclosure.
Figure 11O:
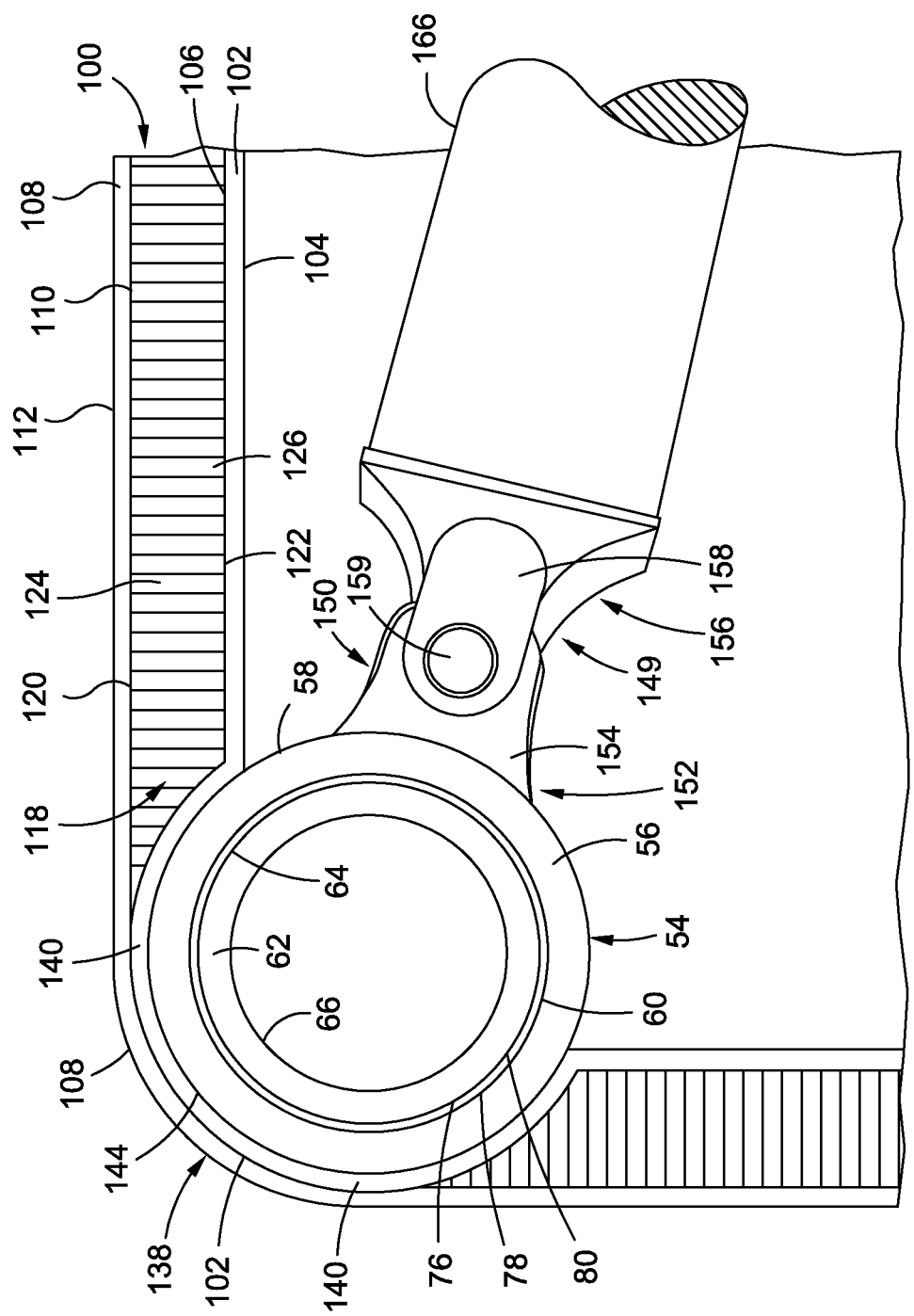
FIG. 11O is an illustration of a close-up of a braided thermoplastic tubular truss rib attached via a connector element to a braided thermoplastic tubular spar cap; and, FIG. 12 is a flow diagram illustrating one of the embodiments of a method of the disclosure.

The thermoplastic skin panel 100 further comprises skin panel stabilization elements 118 (see FIGS. 4C and 11O) having an inner surface 120 (see FIG. 11O) and an outer surface 122 (see FIG. 11O). In one embodiment the skin panel stabilization elements 118 may comprise a plurality of core elements 124 (see FIG. 4C). Each core element 124 may comprise a thermoplastic honeycomb sandwich core 126 (see FIGS. 4C, 5B, 11O), a foam material core 128 (see FIG. 4C), or another suitable core element. In another embodiment as shown in FIGS. 4C and 10, the skin panel stabilization elements 118 may comprise a combination of a plurality of stringers 130 joined to first portions 132 of the inner thermoplastic facesheet 102 and a plurality of panel stiffeners 134 joined to second portions 136 of the inner thermoplastic facesheet 102.

As shown in FIG. 11O, preferably, the thermoplastic skin panel 100 comprises a plurality of core pads 138 comprised of the corner area where the inner thermoplastic facesheet 102, preferably of braided thermoplastic 114, comes together with the outer thermoplastic facesheet 108, preferably of braided thermoplastic 114. The inner and outer thermoplastic facesheets 102, 108, respectively, preferably ramp down at edges 140 of the core pads 138 to join together braided thermoplastic to braided thermoplastic, and preferably, the inner and outer thermoplastic facesheets 102, 108 are configured to interface with an outer surface 144 of the braided thermoplastic tubular spar cap 54 when the thermoplastic skin panel 100 is formed under heat around the braided thermoplastic tubular spar cap 54. Further, the thermoplastic skin panel 100 and the outer surface 144 of the braided thermoplastic tubular spar cap 54 are preferably co-consolidated under heat and pressure.

Figure 7:
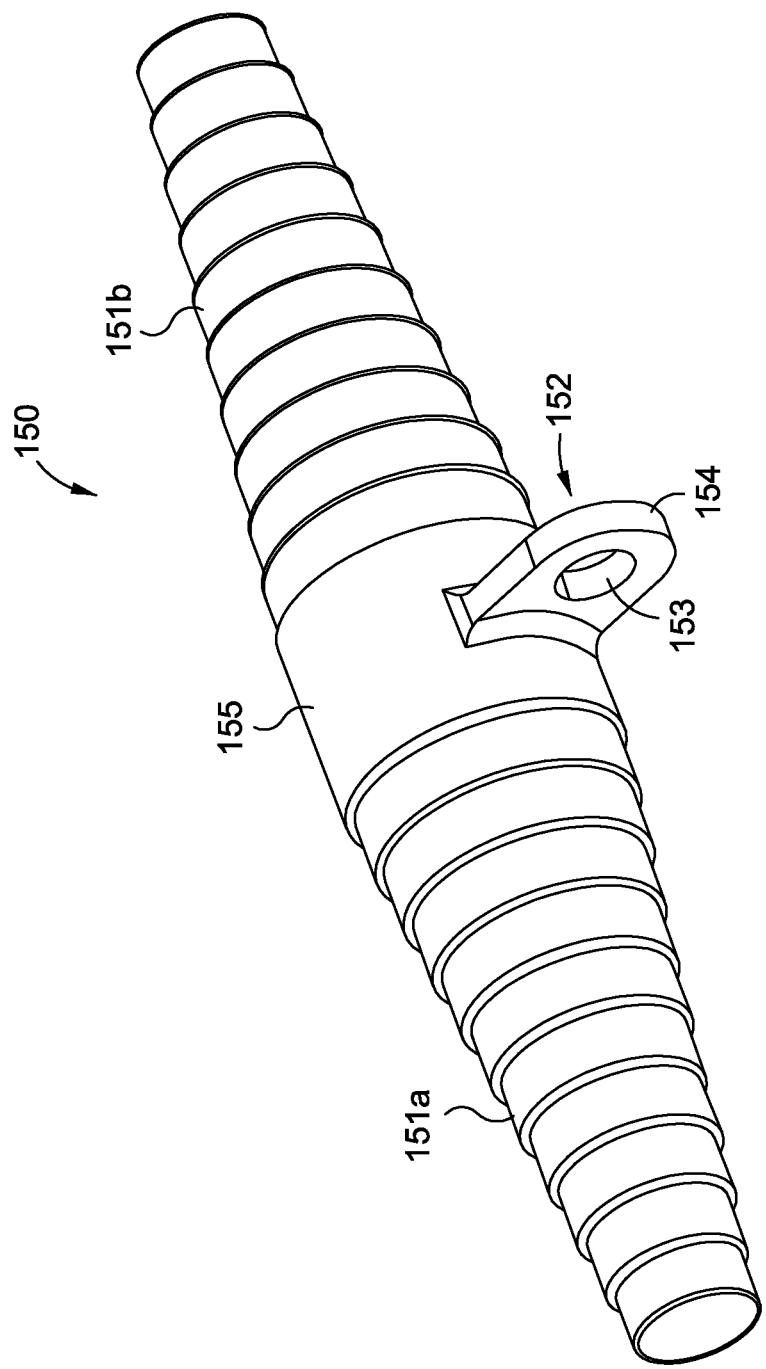
FIG. 7 is an illustration of an isometric perspective view of one of the embodiments of a connector element of the thermoplastic stabilizer torque box assembly of the disclosure.

Preferably, the apparatus 50 comprises the braided thermoplastic tubular spar cap 54 which is connected to a connector element 150 (see FIGS. 4A, 4B and 7). FIG. 7 is an illustration of an isometric perspective view of one of the embodiments of the connector element 150 of the disclosure. The connector element 150 preferably comprises a male portion 152 (see FIGS. 7, 11O) such as a male clevis lug 154 (see FIGS. 7 and 11O). The connector element 150 may be comprised of a material such as titanium, carbon composite, aluminum, stainless steel, or another suitable material. More preferably, the connector element 150 is comprised of titanium.

As shown in FIG. 7, the male portion 152 may have an opening 153 for a bolt or other attachment element 159 (see FIG. 11O). As shown in FIG. 7, the connector element 150 may further comprise elongated stepped portions 151a, 151b, and a ring portion 155.

Figure 9:
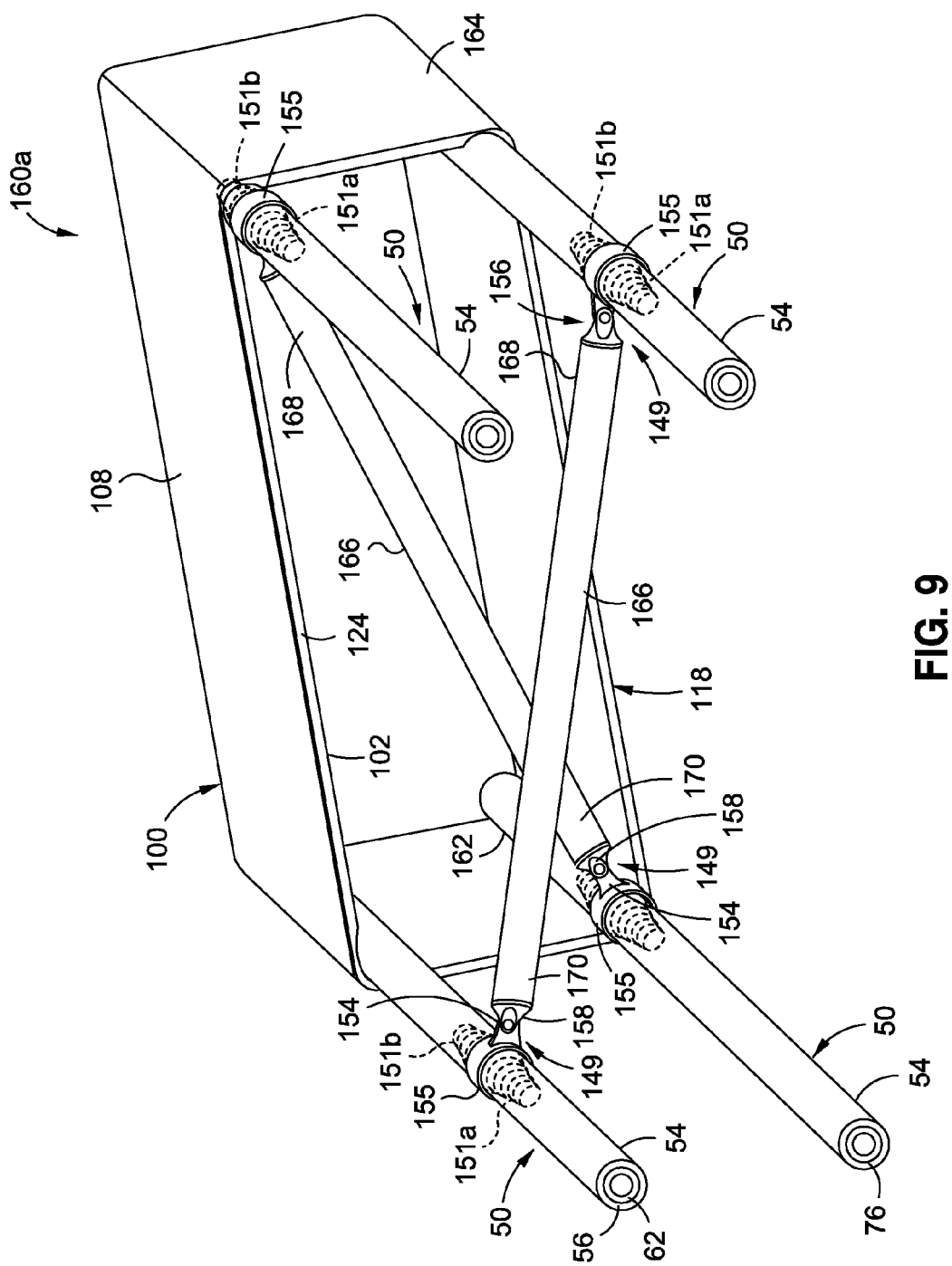
FIG. 9 is an illustration of an isometric view of another one of the embodiments of a thermoplastic stabilizer torque box assembly of the disclosure.

The braided thermoplastic tubular spar caps 54 may be preferably connected to one or more braided thermoplastic tubular truss ribs 166 (see FIGS. 9 and 10) via one or more connection assemblies 149 (see FIGS. 9 and 10). The connection assemblies 149 comprise the connector element 152 with the male portion 152 and further comprises a female portion 156 (see FIG. 11O), such as a single pinned female clevis lug 158 (see FIG. 9). FIGS. 9 and 10 show multiple connection assemblies 149. The male portion 152 is preferably connected to the braided thermoplastic tubular spar cap 54, and the female portion 156 is preferably connected to the braided thermoplastic tubular truss rib 166 (see FIG. 11O).

In another embodiment, as shown in FIG. 4B, there is provided a thermoplastic stabilizer torque box assembly 160. The thermoplastic stabilizer torque box assembly 160 may be, for example, a horizontal stabilizer 24 (see FIG. 1) or a vertical stabilizer 22 (see FIG. 1), for a vehicle, such as an aircraft 10 (see FIG. 1). FIG. 4B is an illustration of a functional block diagram showing one of the embodiments of the thermoplastic stabilizer torque box assembly 160 of the disclosure. FIG. 9 is an illustration of an isometric view of one of the embodiments of the thermoplastic stabilizer torque box assembly 160a with the skin panel stabilization elements 118 comprising core elements 124. FIG. 10 is an illustration of an isometric view of another one of the embodiments of the thermoplastic stabilizer torque box assembly 160b with the skin panel stabilization elements 118 comprising stringers 130 and panel stiffeners 134. As shown in FIG. 9, the thermoplastic stabilizer torque box assembly 160 comprises a plurality of braided thermoplastic tubular spar caps 54 spaced to define a torque box inner portion 162. As discussed above, each braided thermoplastic tubular spar cap 54 comprises an outer braided thermoplastic tube 56 and an inner braided thermoplastic tube 62 disposed within the outer braided thermoplastic tube 56. The outer braided thermoplastic tube 56 and the inner braided thermoplastic tube 62 together carry an ultimate load 72. The inner braided thermoplastic tube 62 also carries a limit load 74. Each braided thermoplastic tubular spar cap 54 further comprises a separation ply layer 76 co-consolidated between the outer braided thermoplastic tube 56 and the inner braided thermoplastic tube 62. The separation ply layer 76 provides reinforcement 82 (FIG. 4A) and impact damage resistance 84 (FIG. 4A) to the inner braided thermoplastic tube 62 in order to avoid a loss in structural loading capability. As discussed above, as shown in FIG. 4A, the separation ply layer 76 preferably comprises a ply material 86, such as a metal foil 88, for example, titanium 90, steel, aluminum or another suitable metal; a non-carbon material 92; a fiberglass material 94, or another suitable ply material. More preferably, the separation ply layer 76 is comprised of titanium 90 or another material having an electrical conductivity 96 to provide a lightning grounding path 98.

As shown in FIG. 9, the thermoplastic stabilizer torque box assembly 160 further comprises a thermoplastic skin panel 100 co-consolidated with the plurality of braided thermoplastic tubular spar caps 54 to define a torque box outer portion 164. As discussed above, the thermoplastic skin panel 100 comprises an inner thermoplastic facesheet 102 and an outer thermoplastic facesheet 108. In one embodiment, the inner and outer thermoplastic facesheets 102, 108, respectively, are comprised of braided thermoplastic 114 (see FIG. 4C) having the triaxial braided configuration 69 (see FIG. 8B). In another embodiment, the inner and outer thermoplastic facesheets 102, 108, respectively, are comprised of slit tape thermoplastic 116 (see FIG. 4C). As discussed above, preferably, the inner and outer thermoplastic facesheets 102, 108 are comprised of a thermoplastic material, such as carbon fiber composite material, carbon fiber reinforced, semi crystalline, polymer material, for example, carbon fiber reinforced polypheylene sulfide (PPS), carbon fiber reinforced polyetheretherketone (PEEK), carbon fiber reinforced polyetherketoneketone (PEKK), carbon fiber reinforced polyethyleneimine (PEI), or another suitable thermoplastic material.

As discussed above, the thermoplastic skin panel 100 further comprises skin panel stabilization elements 118 (see FIGS. 4C and 9). In one embodiment the skin panel stabilization elements 118 may comprise a plurality of core elements 124 (see FIGS. 4C and 9). Each core element 124 may comprise a thermoplastic honeycomb sandwich core 126 (see FIGS. 4C and 5B), a foam material core 128, or another suitable core element. In another embodiment as shown in FIG. 10, the skin panel stabilization elements 118 may comprise a combination of a plurality of stringers 130 joined to first portions 132 of the inner thermoplastic facesheet 102 and a plurality of panel stiffeners 134 joined to second portions 136 of the inner thermoplastic facesheet 102 via welding or co-consolidation. When the skin panel stabilization elements 118 comprise stringers 130 and panel stiffeners 134, the inner and outer thermoplastic facesheets 102, 108 may also be combined into a solid component or skin portion.

As discussed above, as shown in FIG. 11O, preferably, the thermoplastic skin panel 100 comprises a plurality of core pads 138 comprised of the corner area where the inner thermoplastic facesheet 102, preferably of braided thermoplastic 114, comes together with the outer thermoplastic facesheet 108, preferably of braided thermoplastic 114. The inner and outer thermoplastic facesheets 102, 108, respectively, preferably ramp down at edges 140 of the core pads 138 to join together braided thermoplastic to braided thermoplastic, and preferably, the inner and outer thermoplastic facesheets 102, 108 are configured to interface with an outer surface 144 of the braided thermoplastic tubular spar cap 54 when the thermoplastic skin panel 100 is formed under heat around the braided thermoplastic tubular spar cap 54. Further, the thermoplastic skin panel 100 and the outer surface 144 of the braided thermoplastic tubular spar cap 54 are preferably co-consolidated under heat and pressure.

As shown in FIGS. 4B, 9 and 10, the thermoplastic stabilizer torque box assembly 160 further comprises one or more braided thermoplastic tubular truss ribs 166 each having a first end 168 (see FIG. 9) and a second end 170 (see FIG. 9). The one or more braided thermoplastic tubular truss ribs 166 are preferably connected to the one or more braided thermoplastic tubular spar caps 54 via one or more connection assemblies 149 (see FIG. 9). In one embodiment, the braided thermoplastic tubular truss rib 166 may have a similar structure to the braided thermoplastic tubular spar cap 54 where each braided thermoplastic tubular truss rib 166 comprises an outer braided thermoplastic tube 56 and an inner braided thermoplastic tube 62 disposed within the outer braided thermoplastic tube 56, and comprises a separation ply layer 76 co-consolidated between the outer braided thermoplastic tube 56 and the inner braided thermoplastic tube 62. Preferably, the outer braided thermoplastic tube 56 and the inner braided thermoplastic tube 62 both have a triaxial braided configuration 69 (see FIG. 8B). The separation ply layer 76 provides reinforcement 82 (see FIG. 4A) and impact damage resistance 84 (see FIG. 4A) to the inner braided thermoplastic tube 62. The separation ply layer 76 preferably comprises a ply material 86, such as a metal foil 88, for example, titanium 90, steel or aluminum; a non-carbon material 92; a fiberglass material 94 or another suitable ply material.

In another embodiment, the braided thermoplastic tubular truss rib 166 may comprise the outer braided thermoplastic tube 56 having a biaxial braided configuration 68 (see FIG. 8A) and the inner braided thermoplastic tube 62 having the triaxial braided configuration 69 (see FIG. 8B). In yet another embodiment, the braided thermoplastic tubular truss rib 166 may comprise the outer braided thermoplastic tube 56 having the triaxial braided configuration 69 (see FIG. 8B) and the inner braided thermoplastic tube 62 having the biaxial braided configuration 68 (see FIG. 8A). FIG. 8A is an illustration of a known braided preform 70 having a biaxial braided configuration 68.

In another embodiment, the braided thermoplastic tubular truss rib 166 may comprise only an outer braided thermoplastic tube 56 structure with no inner braided thermoplastic tube 62 or separation ply layer 76. The outer braided thermoplastic tube 56 preferably comprises the triaxial braided configuration 69 (see FIG. 8B). Alternatively, the braided thermoplastic tubular truss rib 166 may comprise another suitable braided structure.

Preferably, the outer braided thermoplastic tube 56 and, if present, the inner braided thermoplastic tube 62, of the braided thermoplastic tubular truss rib 166 are comprised of a thermoplastic material, such as carbon fiber composite material, carbon fiber reinforced, semi crystalline, polymer material, for example, carbon fiber reinforced polypheylene sulfide (PPS), carbon fiber reinforced polyetheretherketone (PEEK), carbon fiber reinforced polyetherketoneketone (PEKK), carbon fiber reinforced polyethyleneimine (PEI), or another suitable thermoplastic material. The utilization of braided thermoplastic material for the outer braided thermoplastic tube 56 and the inner braided thermoplastic tube 62 of the braided thermoplastic tubular truss ribs 166 may provide inherent through the thickness capability over known solid tape laminates and may further provide damage resistance and damage tolerance.

In one embodiment as shown in FIG. 11M, the thermoplastic stabilizer torque box assembly 160 may have one braided thermoplastic tubular truss rib 166 connected diagonally to two braided thermoplastic tubular spar caps 54 positioned diagonally with respect to each other. In another embodiment as shown in FIG. 11N, the thermoplastic stabilizer torque box assembly 160 may have two braided thermoplastic tubular truss ribs 166 each connected diagonally to two braided thermoplastic tubular spar caps 54 positioned diagonally with respect to each other, such that the two braided thermoplastic tubular truss ribs 166 cross over each other. The braided thermoplastic tubular truss ribs 166 preferably provide additional reinforcement to the thermoplastic stabilizer torque box assembly 160. The thermoplastic stabilizer torque box assembly 160 may also have more than two braided thermoplastic tubular truss ribs 166 attached to the braided thermoplastic tubular spar caps 54.

As shown in FIGS. 4B, 9 and 10, the thermoplastic stabilizer torque box assembly 160 preferably further comprises one or more connector elements 150. As discussed above, the one or more braided thermoplastic tubular truss ribs 166 are preferably connected to the one or more braided thermoplastic tubular spar caps 54 via one or more connection assemblies 149 (see FIG. 9). Each connection assembly 149 preferably comprises the connector element 150 connected to the braided thermoplastic tubular spar cap 54 and having the male portion 152, and further comprises the female portion 156 connected to the braided thermoplastic tubular truss rib 166. The connector element 150 preferably comprises the male portion 152 (see FIGS. 7, 9) such as the male clevis lug 154 (see FIG. 9). As shown in FIG. 7, the male portion 152 may have the opening 153 for a bolt or other attachment element 159 (see FIG. 11O). The male portion 152 is preferably configured to connect to the braided thermoplastic tubular spar cap 54. The female portion 156 is preferably configured to connect to the braided thermoplastic tubular truss rib 166 (see FIG. 9). The female portion 156 preferably comprises a single pinned female clevis lug 158 (see FIG. 9). The connector element 150 may be comprised of a material such as titanium, carbon composite, aluminum, stainless steel, or another suitable material. More preferably, the connector element 150 is comprised of titanium.

The thermoplastic stabilizer torque box assembly 160 may be used in vehicles or other devices having a torque box, such as an aircraft 10 (see FIG. 1), a spacecraft, a rotorcraft, a watercraft, an automobile, a truck, a bus, a train or another suitable vehicle or device. More preferably, the thermoplastic stabilizer torque box assembly 160 is used in an aircraft 10. The thermoplastic stabilizer torque box assembly 160 preferably has a decreased overall weight of greater than about 10% as compared to an overall weight of known composite skin and stringer torque box assemblies. More preferably, the thermoplastic stabilizer torque box assembly 160 has a decreased overall weight in a range of from about 10% to about 15% as compared to an overall weight of known composite skin and stringer torque box assemblies.

Figure 5A:
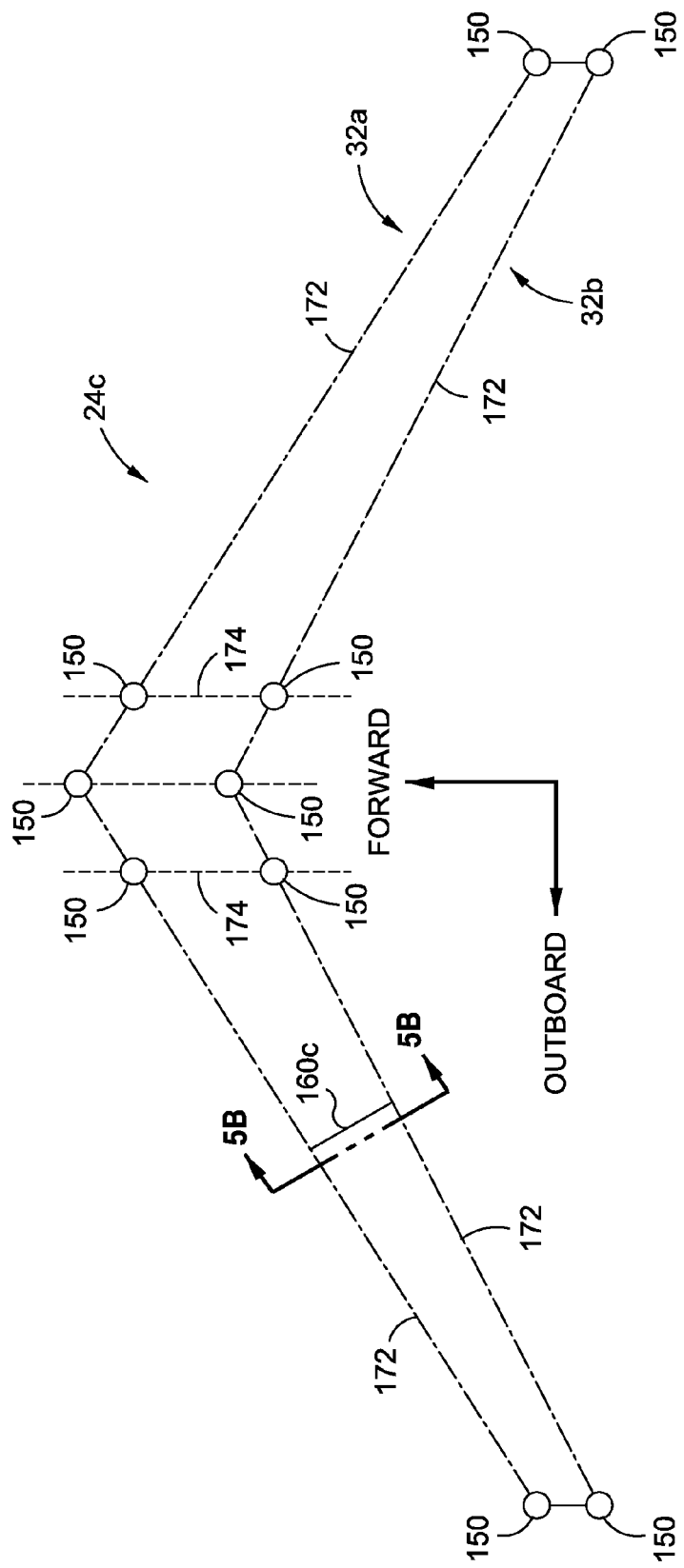
FIG. 5A is an illustration of a schematic top plan view of one of the embodiments of a thermoplastic stabilizer torque box assembly of the disclosure.

FIG. 5A is an illustration of a schematic top plan view of one of the embodiments of a thermoplastic stabilizer torque box assembly 160c of the disclosure installed in a horizontal stabilizer 24c. FIG. 5A shows the front spar 32a, the rear spar 32b, connector elements 150, centerlines 172 of the braided thermoplastic tubular spar caps 54 (see FIG. 5B), and centerlines 174 of the braided thermoplastic tubular truss ribs 166 (see FIG. 9). FIG. 5B is an illustration of a cross-sectional view taken along lines 5B-5B of FIG. 5A. FIG. 5B shows a side sectional view of the thermoplastic stabilizer torque box assembly 160c of FIG. 5A. FIG. 5B shows four braided thermoplastic tubular spar caps 54 co-consolidated with four thermoplastic skin panels 100 to form a torque box structure 176. FIG. 5B further shows two of the braided thermoplastic tubular spar caps 54 connected to connector elements 150 for diagonal connection of a braided thermoplastic tubular truss rib 166 (see FIG. 9) in a position indicated by dashed line 178. Approximately 80% of the load is carried by the braided thermoplastic tubular spar caps 54 and approximately 20% of the load is carried by the thermoplastic skin panels 100. A leading and trailing edge interface element 180 (see FIG. 6) is preferably attached to the outer thermoplastic facesheet 108 at each corner or core pad 138 (see FIG. 11O) of the thermoplastic stabilizer torque box assembly 160c (see FIG. 5B) via welding or co-consolidation. FIG. 6 is an illustration of a sectional view of one of the embodiments of a leading and trailing edge interface element 180, such as in the form of a T-section, wherein an interior curved portion 181 is configured to correspond in shape to each of the four corners or core pads 138 (see FIG. 11O) of the outer thermoplastic facesheet 108. Although FIG. 6 shows only one leading and trailing edge interface element 180 in position for attachment to the thermoplastic stabilizer torque box assembly 160c of FIG. 5B, preferably four leading and trailing edge interface elements 180 are welded or co-consolidated to the outer thermoplastic facesheet 108 at each of the four corners or core pads 138 (see FIG. 11O) of the thermoplastic stabilizer torque box assembly 160c of FIG. 5B.

FIGS. 11A-11N and 11O illustrate one embodiment of a fabrication sequence for fabricating one of the embodiments of the thermoplastic stabilizer torque box assembly 160 of the disclosure. FIG. 11A is an illustration of a removable split tooling mandrel 250 having a first half 252a and a second half 252b used in one of the embodiments of a method, such as method 200 (see FIG. 12) of fabricating the thermoplastic stabilizer torque box assembly 160 of the disclosure. FIG. 11B is an illustration of the removable split tooling mandrel 250 of FIG. 11A and a removable sleeve 254. The removable sleeve 254 may be made of urethane, polyurethane, rubber, neoprene, elastomeric material, or another suitable material. FIG. 11C is an illustration of the removable split tooling mandrel 250 and the removable sleeve 254 of FIG. 11B and the non-consolidated apparatus 50, such as the braided thermoplastic tubular spar cap 54, to be formed in one of the embodiments of the method of fabricating the thermoplastic stabilizer torque box assembly 160 of the disclosure. FIG. 11D is an illustration of the apparatus 50, such as the braided thermoplastic tubular spar cap 54, of FIG. 11C placed in a first half 256a of a tubular match mold tooling apparatus 258. FIG. 11E is an illustration of the braided thermoplastic tubular spar cap 54 of FIG. 11C secured in the first half 256a and a second half 256b of the tubular match mold tooling apparatus 258 for co-consolidation of the braided thermoplastic tubular spar cap 54. FIG. 11F is an illustration of a cut-away view of the co-consolidated braided thermoplastic tubular spar cap 54 in the tubular match mold tooling apparatus 258 of FIG. 11E.

The inner braided thermoplastic tube 62 is first braided on the removable split tooling mandrel 250 by going through a braiding machine or device. In order to manufacture the inner braided thermoplastic tube 62, thermoplastic tape is slit into a desired width and spooled onto bobbins. The bobbins are assembled onto a customized braiding machine or device and the tape is braided into the inner braided thermoplastic tube 62 with a desired diameter, tape angle, and number of zero degree tows. Design of the braid defines width of the slit tape, braid diameter and braid angle. The braiding machine or device used may be an existing braiding machine or device known to one skilled in the art. Once the inner braided thermoplastic tube 62 is formed, the separation ply layer 76 is applied to the inner braided thermoplastic tube 62. Next, the outer braided thermoplastic tube 56 is braided over the separation ply layer 76 by assembling through the braiding machine or device. The inner braided thermoplastic tube 62, the separation ply layer 76, and the outer braided thermoplastic tube 56 are then co-consolidated together with an effective heat and an effective pressure to form the braided thermoplastic tubular spar cap 54.

Once the braided thermoplastic tubular spar caps 54 are co-consolidated, one or more connector elements 150 may be connected to one or more of the braided thermoplastic tubular spar caps 54. The braided thermoplastic tubular spar caps 54 may undergo proof tests for compliance of bonded or co-consolidated carbon (braided thermoplastic tubular spar caps 54) to titanium (connector element 150). Alternatively to proof testing, bonding damage arrestment features may be used. Once the connector elements 150 are connected to the one or more braided thermoplastic tubular spar caps 54, a co-consolidated braided thermoplastic tubular spar cap 54 is placed in a corner 260 (see FIG. 11G) of an internal torque box tooling apparatus 262 to define a torque box inner portion 162 (see FIG. 9). FIG. 11G is an illustration of a fabricated, co-consolidated braided thermoplastic tubular spar cap 54 placed in each corner 260 of the internal torque box tooling apparatus 262 used in one of the embodiments of a method of fabricating the thermoplastic stabilizer torque box assembly 160 of the disclosure. FIG. 11H is an illustration of fabricated, co-consolidated braided thermoplastic tubular spar caps 54, the thermoplastic skin panels 100 having the inner and outer thermoplastic facesheets 102, 108, and skin panel stabilization elements 118 added around the internal torque box tooling apparatus 262. Once the four braided thermoplastic tubular spar caps 54 are in place in each corner 260, an inner thermoplastic facesheet 102 may be braided continuously around the braided thermoplastic tubular spar caps 54 by going through the braiding machine or device if braided thermoplastic 114 is desired. Alternatively, the inner thermoplastic facesheet 102 may be placed or laid up around the braided thermoplastic tubular spar caps 54 by going through an automated fiber placement (AFP) machine or device, if slit tape thermoplastic 116 is desired. Once the inner thermoplastic facesheet 102 is applied around the braided thermoplastic tubular spar caps 54, the skin panel stabilization elements 118, such as the thermoplastic honeycomb sandwich core 126 (see FIG. 9) or the stringers 130 (see FIG. 10) and panel stiffeners 134 (see FIG. 10) is attached to the inner thermoplastic facesheet 102 with a connector element, such as adhesive or connectors, or another suitable connector element. The stringers 130 and panel stiffeners 134 may also be welded to the inner thermoplastic facesheet 102. Next, a continuous outer thermoplastic facesheet 108 may be braided around the skin panel stabilization elements 118 by going through the braiding machine or device if braided thermoplastic 114 is desired. Alternatively, the outer thermoplastic facesheet 108 may be placed or laid up around the skin panel stabilization elements 118 by going through an automated fiber placement (AFP) machine or device, if slit tape thermoplastic 116 is desired.

The braided or slit tape construction of the inner and outer thermoplastic facesheets 102, 108 may also be overlaid on the braided thermoplastic tubular spar cap 54 framework with Invar tooling, thermoplastic molded bottles, or re-formable materials. Invar, a nickel-steel alloy, is a preferred tooling material for high-volume runs of composite parts because of its durability and a coefficient of thermal expansion (CTE) which is close to that of the reinforced plastics used to mold the parts. Invar alloy has a low rate of thermal expansion that is approximately one tenth that of carbon steel at temperatures up to 400 degrees F. (200 degrees C.). Invar tools may be used with automated tape lay-up (ATL). For automatic fiber placement (AFP) machines, weight may come into play since AFP operations may involve moving the mandrel and/or moving heads to layup the part. For automated tape layers, size and weight may not be as much of a concern since the tool is stationary. ATL may be used for parts with mild contours and large, flat surfaces such as wings.

FIG. 11I is an illustration of the fabricated, co-consolidated braided thermoplastic tubular spar caps 54, the thermoplastic skin panels 100 having the inner and outer thermoplastic facesheets 102, 108, and skin panel stabilization elements 118 of FIG. 11H placed in a first half 264a of a torque box match mold tooling apparatus 266 used in one of the embodiments of a method of fabricating an aircraft horizontal or vertical stabilizer of the disclosure. FIG. 11J is an illustration of the fabricated, co-consolidated braided thermoplastic tubular spar caps 54, the thermoplastic skin panels 100 having the inner and outer thermoplastic facesheets 102, 108, and skin panel stabilization elements 118 of FIG. 11H secured in the first half 264a and a second half 264b of the torque box match mold tooling apparatus 266 for co-consolidation. The co-consolidated braided thermoplastic tubular spar caps 54, the thermoplastic skin panels 100 having the inner and outer thermoplastic facesheets 102, 108, and skin panel stabilization elements 118 are then co-consolidated with an effective heat and an effective pressure. FIG. 11K is an illustration of a cut-away view of the thermoplastic stabilizer torque box 268 of the thermoplastic stabilizer torque box assembly 160 in the torque box match mold tooling apparatus 266 of FIG. 11J.

FIG. 11L is an illustration of the thermoplastic stabilizer torque box 268 of the thermoplastic stabilizer torque box assembly 160 with the torque box match mold tooling apparatus 266 removed as used in one of the embodiments of a method of fabricating a thermoplastic stabilizer torque box assembly 160 of the disclosure. FIG. 11M is an illustration of the thermoplastic stabilizer torque box assembly 160 of FIG. 11L that has been fabricated and with the braided thermoplastic tubular truss rib 166 attached to two braided thermoplastic tubular spar caps 54 via connection assemblies 149. FIG. 11N is an illustration of the thermoplastic stabilizer torque box assembly 160 of FIG. 11L that has been fabricated and with two braided thermoplastic tubular truss ribs 166 attached to four braided thermoplastic tubular spar caps 54 via connection assemblies 149.

FIG. 11O is an illustration of a close-up of the braided thermoplastic tubular truss rib 166 attached to the braided thermoplastic tubular spar cap 54 via connection assembly 149. As discussed above, as shown in FIG. 11O, preferably, the thermoplastic skin panel 100 comprises a plurality of core pads 138 comprised of the corner area where the inner thermoplastic facesheet 102, preferably of braided thermoplastic 114, comes together with the outer thermoplastic facesheet 108, preferably of braided thermoplastic 114. The inner and outer thermoplastic facesheets 102, 108, respectively, preferably ramp down at edges 140 of the core pads 138 to join together braided thermoplastic to braided thermoplastic, and preferably, the inner and outer thermoplastic facesheets 102, 108 are configured to interface with an outer surface 144 of the braided thermoplastic tubular spar cap 54 when the thermoplastic skin panel 100 is formed under heat around the braided thermoplastic tubular spar cap 54. Further, the thermoplastic skin panel 100 and the outer surface 144 of the braided thermoplastic tubular spar cap 54 are preferably co-consolidated under heat and pressure.

Figure 12:
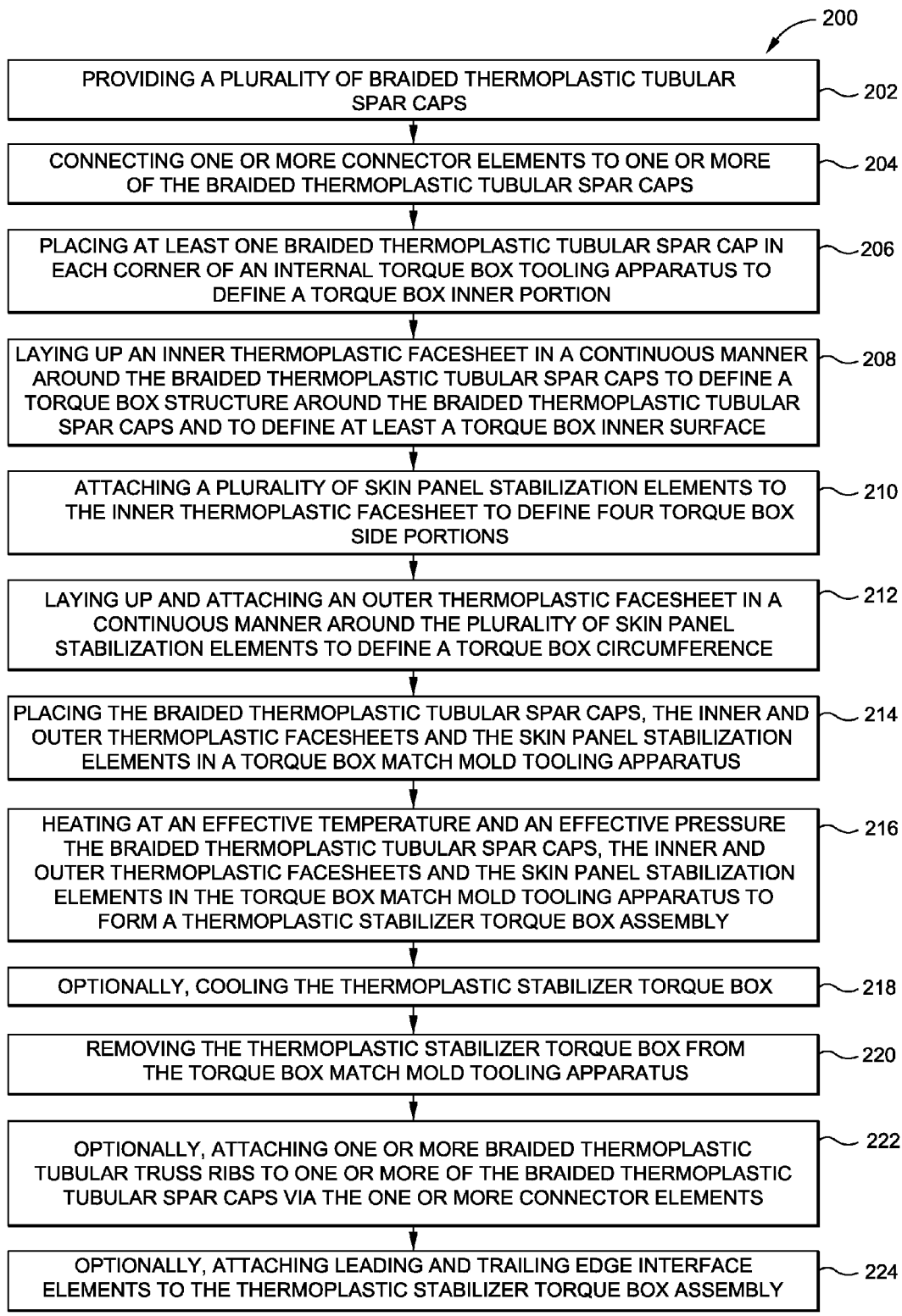

In another embodiment of the disclosure, there is provided a method 200 of fabricating one of the embodiments of the thermoplastic stabilizer torque box assembly 160 or another one of the embodiments. FIG. 12 is a flow diagram illustrating one of the embodiments of the method 200 of the disclosure. The method 200 comprises step 202 of providing a plurality of braided thermoplastic tubular spar caps 54 (see FIGS. 4A, 9) comprising an outer braided thermoplastic tube 56 and an inner braided thermoplastic tube 62 disposed within the outer braided thermoplastic tube 56, and further comprising a separation ply layer 76 co-consolidated between the outer braided thermoplastic tube 56 and the inner braided thermoplastic tube 62. Each braided thermoplastic tubular spar cap 54 may be fabricated by a process of fabrication steps comprising, for example, using a braiding apparatus, such as the braiding machine or device discussed above, to braid thermoplastic material over a removable split tooling mandrel 250 and a removable sleeve 254 (see FIG. 11B) to form an inner braided thermoplastic tube 62; wrapping a separation ply layer 76 comprising a non-carbon material around an outer surface of the inner braided thermoplastic tube 62; using the braiding apparatus to braid additional thermoplastic material over an outer surface of the separation ply layer 76 to form an outer braided thermoplastic tube 56; placing the inner braided thermoplastic tube 62, the separation ply layer 76, and the outer braided thermoplastic tube 56 in a tubular match mold tooling apparatus 258 (see FIG. 11E); heating and co-consolidating at an effective temperature and an effective pressure the inner braided thermoplastic tube 62, the separation ply layer 76, and the outer braided thermoplastic tube 56 in the tubular match mold tooling apparatus 258 to obtain the braided thermoplastic tubular spar cap 54; cooling the braided thermoplastic tubular spar cap 54; and, removing the removable split tooling mandrel 250 and the removable sleeve 254 from the co-consolidated braided thermoplastic tubular spar cap 54.

The method 200 further comprises step 204 of connecting one or more connector elements 150, as discussed above, to one or more of the braided thermoplastic tubular spar caps 54. The connector elements 150 may be used in the connection assemblies 149 to connect the male portion 152 of the connector element 150 to the female portion 156 connected to the internal ribs and/or the braided thermoplastic tubular truss ribs 166. Preferably, the connector elements 150 are comprised of titanium. Connecting, joining or welding the connector elements 150, such as those made from titanium, to the braided thermoplastic tubular spar caps 54, and in one embodiment, to the braided thermoplastic tubular truss ribs 166, may involve using a plasma etch process or another suitable process on the co-consolidated braided thermoplastic tubular spar cap 54 and bonding it with an adhesive, such as a structural adhesive film with long-term durability on honeycomb and metal-to-metal components, for example, structural adhesive film AF 555 from The 3M Company of Minnesota, to the connector element 150, such as made of titanium, where the titanium is preferably treated with a sol gel process. Alternatively, the connector elements 150 made of titanium may be replaced with connector elements 150 made of composite material to reduce cost and weight when parts with satisfactory interlaminar tension capabilities are available.

The method 200 further comprises step 206 of placing at least one braided thermoplastic tubular spar cap 54 in each corner 260 (see FIG. 11G) of an internal torque box tooling apparatus 262 to define a torque box inner portion 162 (see FIG. 11L). The method 200 further comprises step 208 of laying up an inner thermoplastic facesheet 102 in a continuous manner around the braided thermoplastic tubular spar caps 54 to define a thermoplastic stabilizer torque box 268 around the braided thermoplastic tubular spar caps 54 and to define at least a torque box inner surface 270 (see FIG. 11L).

The method 200 further comprises step 210 of attaching a plurality of skin panel stabilization elements 118 to the inner thermoplastic facesheet 102 to define four torque box side portions 272 (see FIG. 11L). The method 200 further comprises step 212 of laying up and attaching the outer thermoplastic facesheet 108 in a continuous manner around the plurality of skin panel stabilization elements 118 to define a torque box circumference 274 (see FIG. 11L). The method 200 further comprises step 214 of placing the braided thermoplastic tubular spar caps 54, the inner and outer thermoplastic facesheets 102, 108, and the skin panel stabilization elements 118 in a torque box match mold tooling apparatus 266 (see FIG. 11J). The method 200 further comprises step 216 of heating at an effective temperature and an effective pressure the braided thermoplastic tubular spar caps 54, the inner and outer thermoplastic facesheets 102, 108, and the skin panel stabilization elements 118 in the torque box match mold tooling apparatus 266 to obtain a thermoplastic stabilizer torque box 268 and the thermoplastic stabilizer torque box assembly 160. The heating step 216 may further comprise joining the braided thermoplastic tubular spar caps 54, the inner and outer thermoplastic facesheets 102, 108, and the skin panel stabilization elements 118 together via a process such as co-consolidation; welding, for example, induction welding or another suitable welding process; or another suitable process for joining the braided thermoplastic tubular spar caps 54, the inner and outer thermoplastic facesheets 102, 108, and the skin panel stabilization elements 118 together.

The method 200 may further comprise optional step 218 of cooling the thermoplastic stabilizer torque box assembly 160. The cooling step may comprise using physical or forced cooling devices to cool the thermoplastic stabilizer torque box assembly 160. Alternatively, the thermoplastic stabilizer torque box assembly 160 may be left at room temperature or ambient temperature to cool down on its own without the use of any additional cooling devices. The method 200 further comprises step 220 of removing the thermoplastic stabilizer torque box 268 and thermoplastic stabilizer torque box assembly 160 from the torque box match mold tooling apparatus 266.

The method 200 may further comprise step 222 of attaching one or more braided thermoplastic tubular truss ribs 166 to one or more of the braided thermoplastic tubular spar caps 54 via the one or more connection assemblies 149 (see FIGS. 9 and 10). Each braided thermoplastic tubular truss rib 166 may be fabricated similarly to the process of fabricating the braided thermoplastic tubular spar caps 54 by a process of fabrication steps comprising, for example, using a braiding apparatus, such as the braiding machine or device discussed above, to braid thermoplastic material over a removable split tooling mandrel 250 and a removable sleeve 254 (see FIG. 11B) to form an inner braided thermoplastic tube 62; wrapping a separation ply layer 76 comprising a non-carbon material around an outer surface of the inner braided thermoplastic tube 62; using the braiding apparatus to braid additional thermoplastic material over an outer surface of the separation ply layer 76 to form an outer braided thermoplastic tube 56; placing the inner braided thermoplastic tube 62, the separation ply layer 76, and the outer braided thermoplastic tube 56 in a tubular match mold tooling apparatus 258 (see FIG. 11E); heating and co-consolidating at an effective temperature and an effective pressure the inner braided thermoplastic tube 62, the separation ply layer 76, and the outer braided thermoplastic tube 56 in the tubular match mold tooling apparatus 258 to form and co-consolidate the braided thermoplastic tubular truss ribs 166; cooling the braided thermoplastic tubular truss ribs 166; and, removing the removable split tooling mandrel 250 and the removable sleeve 254 from the co-consolidated braided thermoplastic tubular truss ribs 166. Alternatively, the braided thermoplastic tubular truss ribs 166 may be formed with only an outer braided thermoplastic tube 62 braided over the removable split tooling mandrel 250 and removable sleeve 254.

The method 200 may further comprise step 224 of attaching leading and trailing edge interface elements 180 (see FIG. 6) to the thermoplastic stabilizer torque box assembly 160, and preferably to corners of the thermoplastic stabilizer torque box assembly 160.

Disclosed embodiments of the apparatus 50, thermoplastic stabilizer torque box assembly 160, and method 200 may provide for an alternate configuration for known aircraft horizontal or vertical stabilizer torque box assemblies. Braided thermoplastic tubular highly orthogonal braided thermoplastic tubular spar caps 54 are preferably co-consolidated or welded to form thermoplastic skin panels 100 that may be braided or slit tape stabilized made of inner and outer thermoplastic facesheets 102, 108, and skin panel stabilization elements 118, such as core elements 124, or stringers 130 and panel stiffeners 134. The braided tubular thermoplastic design for the braided thermoplastic tubular spar caps 54 and the braided thermoplastic tubular truss rib 166 framework provides maximum axial content at a higher loaded end to carry axial and moment bending loads. This is accomplished by utilizing two or more axial ends per unit cell and by changing the angle of the bias tows along the part length. In addition, braiding thickness and diameter may be changed along the part length. The use of the braiding configuration enables the braiding cross-section change over the length to optimize performance, e.g., braid bias angle and number of plies may vary as needed, instead of point design of a single braid configuration. Utilization of braided materials for the spar caps and thermoplastic skin panels may provide inherent through the thickness capability, damage resistance and damage tolerance, increased bondline quality, and honeycomb sandwich panel arrest features In addition, the use of braiding may decrease costs of fabrication and manufacture since once a braiding machine is set up, it may not require as much attention from an operator. Disclosed embodiments of the apparatus 50, thermoplastic stabilizer torque box assembly 160, and method 200 also provide weight and cost reductions compared to existing composite skin and stringer design solutions, and such disclosed embodiments of the apparatus 50, thermoplastic stabilizer torque box assembly 160, and method 200 may also be produced at a faster rate than known composite skin and stringer designs.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An apparatus to provide panel stiffening, the apparatus comprising:
   a plurality of braided thermoplastic tubular spar caps, each braided thermoplastic tubular spar cap comprising:
   an outer braided thermoplastic tube;
   an inner braided thermoplastic tube disposed within the outer braided thermoplastic tube; and,
   a separation ply layer co-consolidated between the outer braided thermoplastic tube and the inner braided thermoplastic tube and around an entire circumference of the inner braided thermoplastic tube, the separation ply layer comprising a metal foil and the separation ply layer providing reinforcement and impact damage resistance to the inner braided thermoplastic tube in order to avoid a loss in structural loading capability; and,
   one or more braided thermoplastic tubular truss ribs connected to the plurality of braided thermoplastic tubular spar caps via one or more connection assemblies.

2. The apparatus of claim 1, wherein the outer braided thermoplastic tube and the inner braided thermoplastic tube together carry an ultimate load, and further wherein the inner braided thermoplastic tube carries a limit load.

3. The apparatus of claim 1, wherein the metal foil comprises titanium, steel, or aluminum.

4. The apparatus of claim 1, wherein the plurality of braided thermoplastic tubular spar caps are co-consolidated to a thermoplastic skin panel, the thermoplastic skin panel comprising an inner thermoplastic facesheet, an outer thermoplastic facesheet, and a plurality of skin panel stabilization elements.

5. The apparatus of claim 4, wherein the inner and outer thermoplastic facesheets comprise a material selected from a group comprising a braided thermoplastic and a slit tape thermoplastic.

6. The apparatus of claim 4, wherein the skin panel stabilization elements comprise core elements selected from a group comprising a thermoplastic honeycomb sandwich core and a foam material core.

7. The apparatus of claim 4, wherein the skin panel stabilization elements comprise a plurality of stringers and a plurality of panel stiffeners.

8. The apparatus of claim 1, wherein the apparatus comprises a braided thermoplastic tubular spar cap connected to a connector element having a male portion configured to connect to a female portion connected to a braided thermoplastic tubular truss rib.

9. The apparatus of claim 8, wherein the connector element comprises a material selected from a group comprising titanium, carbon composite, aluminum, and stainless steel.

10. A thermoplastic torque box assembly comprising:
    a plurality of braided thermoplastic tubular spar caps spaced to define a torque box inner portion, each braided thermoplastic tubular spar cap comprising:
    an outer braided thermoplastic tube;
    an inner braided thermoplastic tube disposed within the outer braided thermoplastic tube; and,
    a separation ply layer co-consolidated between the outer braided thermoplastic tube and the inner braided thermoplastic tube and around an entire circumference of the inner braided thermoplastic tube, the separation ply layer comprising a metal foil and the separation ply layer providing reinforcement and impact damage resistance to the inner braided thermoplastic tube in order to avoid a loss in structural loading capability;
    a thermoplastic skin panel co-consolidated to the plurality of braided thermoplastic tubular spar caps to define a torque box outer portion, the thermoplastic skin panel comprising:
    an inner thermoplastic facesheet;
    an outer thermoplastic facesheet; and, a plurality of the skin panel stabilization elements; and,
one or more braided thermoplastic tubular truss ribs connected to the one or more braided thermoplastic tubular spar caps via one or more connection assemblies.

11. The assembly of claim 10, wherein the outer braided thermoplastic tube and the inner braided thermoplastic tube together carry an ultimate load, and further wherein the inner braided thermoplastic tube carries a limit load.

12. The assembly of claim 10, wherein the metal foil comprises titanium, steel, or aluminum.

13. The assembly of claim 10, wherein the metal foil comprises titanium and has an electrical conductivity to provide a lightning grounding path.

14. The assembly of claim 10, wherein the inner and outer thermoplastic facesheets comprise a material selected from a group comprising braided thermoplastic and slit tape thermoplastic.

15. The assembly of claim 10, wherein the skin panel stabilization elements comprise core elements selected from a group comprising a thermoplastic honeycomb sandwich core and a foam material core.

16. The assembly of claim 10, wherein the skin panel stabilization elements comprise a plurality of stringers and a plurality of panel stiffeners.

17. The assembly of claim 10, wherein the one or more connection assemblies have a connector element comprised of a material selected from a group comprising titanium, carbon composite, aluminum, and stainless steel.

18. The assembly of claim 10, wherein the thermoplastic stabilizer torque box assembly is in a vehicle selected from a group comprising an aircraft, a spacecraft, a rotorcraft, a watercraft, an automobile, a truck, a bus, and a train.

* * * * *